United States Patent
Zirwas et al.

(10) Patent No.: US 12,184,356 B2
(45) Date of Patent: Dec. 31, 2024

(54) PRECODING TRACKING FOR CELL FREE MASSIVE MIMO

(71) Applicant: NOKIA TECHNOLOGIES OY, Espoo (FI)

(72) Inventors: Wolfgang Zirwas, Munich (DE); Mihai Enescu, Espoo (FI)

(73) Assignee: NOKIA TECHNOLOGIES OY, Espoo (FI)

(*) Notice: Subject to any disclaimer, the term of this patent is extended or adjusted under 35 U.S.C. 154(b) by 379 days.

(21) Appl. No.: 17/757,217

(22) PCT Filed: Dec. 2, 2020

(86) PCT No.: PCT/IB2020/061371
§ 371 (c)(1),
(2) Date: Jun. 10, 2022

(87) PCT Pub. No.: WO2021/116831
PCT Pub. Date: Jun. 17, 2021

(65) Prior Publication Data
US 2023/0006713 A1 Jan. 5, 2023

Related U.S. Application Data

(60) Provisional application No. 62/947,097, filed on Dec. 12, 2019.

(51) Int. Cl.
*H04B 7/024* (2017.01)
*H04B 7/06* (2006.01)

(52) U.S. Cl.
CPC ............ *H04B 7/024* (2013.01); *H04B 7/063* (2013.01)

(58) Field of Classification Search
None
See application file for complete search history.

(56) References Cited

U.S. PATENT DOCUMENTS

2020/0186208 A1* 6/2020 Molés Cases ....... H04B 7/0456
2020/0220579 A1* 7/2020 Yang ..................... H04B 7/024

FOREIGN PATENT DOCUMENTS

| CN | 105766023 B | 5/2019 |
| WO | 2015043504 A1 | 4/2015 |
| WO | 2018174578 A1 | 9/2018 |

OTHER PUBLICATIONS

International Search Report and Written Opinion for International Application No. PCT/IB2020/061371, mailed on Feb. 19, 2021, 13 pages.

(Continued)

*Primary Examiner* — Anh Ngoc M Nguyen
(74) *Attorney, Agent, or Firm* — Lippes Mathias LLP

(57) ABSTRACT

A method may include transmitting, by a network node within a wireless network to a reference node, a first precoded tracking signal based on estimated precoding weights that are estimated to provide a predetermined signal at the reference node; receiving, by the network node from the reference node, a message including information related to whether or not the predetermined signal was received at the reference node based, at least in part, on the first precoded tracking signal transmitted by the network node; performing the following, by the network node, if the predetermined signal was not received at the reference node: adjusting one or more transmission parameters of the network node, that is estimated to more accurately provide the predetermined signal at the reference node; and transmitting, by the network node, a second precoded tracking signal based on adjusted transmission parameters.

14 Claims, 12 Drawing Sheets

(56) References Cited

OTHER PUBLICATIONS

Office Action for India Application No. 202247039494, mailed on Nov. 2, 2022, 6 pages.

* cited by examiner

PRECODING TRACKING FOR CELL FREE MASSIVE MIMO

CROSS-REFERENCE TO RELATED APPLICATIONS

This application is a national stage entry of International Application No. PCT/IB2020/061371, filed Dec. 2, 2020, entitled "PRECODING TRACKING FOR CELL FREE MASSIVE MIMO" which claims the benefit of priority of U.S. Provisional Application No. 62/947,097, filed Dec. 12, 2019, both of which are hereby incorporated by reference in their entireties.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include transmitting, by a network node within a wireless network to a reference node, a first precoded tracking signal based on estimated precoding weights that are estimated to provide a predetermined signal at the reference node; receiving, by the network node from the reference node, a message including information related to whether or not the predetermined signal was received at the reference node based, at least in part, on the first precoded tracking signal transmitted by the network node; performing the following, by the network node, if the predetermined signal was not received at the reference node: adjusting one or more transmission parameters of the network node, that is estimated to more accurately provide the predetermined signal at the reference node; and transmitting, by the network node, a second precoded tracking signal based on adjusted transmission parameters.

According to another example embodiment, a method may include transmitting, by a network node within a wireless network to a reference node based on estimated precoding weights, a first precoded tracking signal that is estimated to provide a predetermined signal at the reference node; receiving, by the network node from the reference node, feedback relating to a precoding performance that is based on at least the first precoded tracking signal; and adjusting, based on the received feedback, one or more transmission parameters of the network node, that is estimated to more accurately provide the predetermined signal at the reference node.

According to another example embodiment, a method may include receiving, by a reference node, a first signal based, at least in part, on a first precoded tracking signal received by the reference node from at least one network node; determining, by the reference node, whether or not the first signal is a predetermined signal; transmitting, by the reference node to the at least one network node, a message relating to whether or not the predetermined signal was received at the reference node; and performing the following if the predetermined signal was not received at the reference node: receiving, by the reference node, a second signal based, at least in part, on adjusted transmission parameters, for the at least one network node, that are adjusted in response to the message.

According to another example embodiment, a method may include receiving, by a reference node, a first signal based, at least in part, on a first precoded tracking signal received by the reference node from at least one network node, wherein the first signal is provided at the reference node based on a cooperative joint transmission of precoded signals from a plurality of network nodes; determining, by the reference node, whether or not the first signal is a predetermined signal; and transmitting, by the reference node to the at least one network node, a message relating to whether or not the predetermined signal was received at the reference node.

According to another example embodiment, a method may include receiving, by a wireless node within a wireless network from a network node, an instruction to transmit phase tracking reference signals on behalf of the network node; and transmitting, by the wireless node based on the instruction, phase tracking reference signals to one or more user devices.

Other example embodiments are provided or described for each of the example methods, including: means for performing any of the example methods; a non-transitory computer-readable storage medium comprising instructions stored thereon that, when executed by at least one processor, are configured to cause a computing system to perform any of the example methods; and an apparatus including at least one processor, and at least one memory including computer program code, the at least one memory and the computer program code configured to, with the at least one processor, cause the apparatus at least to perform any of the example methods.

The details of one or more examples of embodiments are set forth in the accompanying drawings and the description below. Other features will be apparent from the description and drawings, and from the claims.

DETAILED DESCRIPTION

Figure 1:
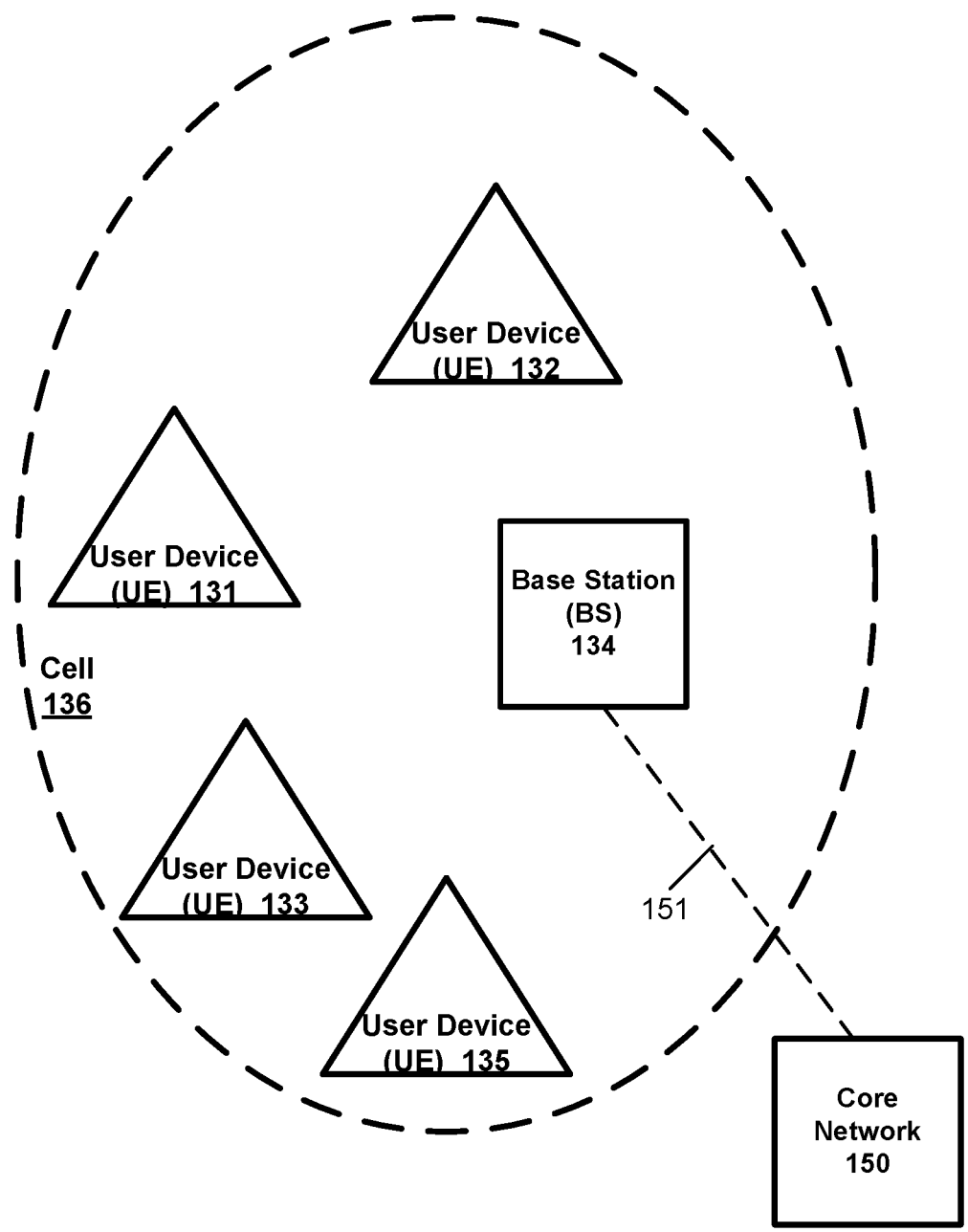
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a BS, next generation Node B (gNB), a next generation enhanced Node B (ng-eNB), or a network node. The terms user device and user equipment (UE) may be used interchangeably. A BS may also include or may be referred to as a RAN (radio access network) node, and may include a portion of a BS or a portion of a RAN node, such as (e.g., such as a central or centralized unit (CU) and/or a distributed unit (DU) in the case of a split BS). At least part of the functionalities of a BS (e.g., access point (AP), base station (BS) or (e)Node B (eNB), BS, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface or NG interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node (e.g., BS, eNB, gNB, CU/DU, . . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform. A base station may also be DU (Distributed Unit) part of IAB (Integrated Access and Backhaul) node (a.k.a. a relay node). DU facilitates the access link connection(s) for an IAB node. A transmitter receiver point (TRP) may include any network node that may be capable of transmitting and/or receiving signals.

A user device (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. A user device may be also MT (Mobile Termination) part of IAB (Integrated Access and Backhaul) node (a.k.a. a relay node). MT facilitates the backhaul connection for an IAB node.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or Narrow Band IoT (NB-IoT) user devices, enhanced mobile broadband (eMBB), and ultra-reliable and low-latency communications (URLLC). Many of these new 5G (NR)-related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of 10-5 and up to 1 ms U-Plane (user/data plane) latency, by way of illustrative example. Thus, for example, URLLC user devices/UEs may require a significantly lower block error rate (BLER) than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The various example embodiments may be applied to a wide variety of wireless technologies or wireless networks, such as LTE, LTE-A, 5G (New Radio (NR)), cmWave, and/or mmWave band networks, IoT, MTC, eMTC, eMBB, URLLC, etc., or any other wireless network or wireless technology. These example networks, technologies or data service types are provided only as illustrative examples.

Network nodes (e.g., BSs or gNBs, DUs, CUs, UEs, or receiver devices, relay stations or relay nodes, transmitter receiver points (TRPS), remote radio heads (RRHs) or other network nodes) may use beamforming, in which a set of antenna weights may be applied to generate a specific antenna beam width and shape for transmitting or receiving (e.g., in order to obtain a beamforming gain), instead of using an omnidirectional antenna. An antenna (or antenna array) may include multiple antenna elements, where a specific beam (e.g., including a beam direction and/or beam width) may be generated or obtained by applying a set of antenna weights (e.g., each antenna weight including an amplitude and phase) to the antenna array, with a different weight applied to each antenna element. For example, a direction of the beam from a phased antenna array may be changed by adjusting the phase of the signal applied to each of the elements in the antenna array. Thus, for example, a transmit beam may be generated for transmitting a signal, and/or a receive beam may be generated for receiving a signal, e.g., in order to provide a beamforming gain for a received signal.

Also, for example, a UE (or user device or receiver device) may be configured to send measurement reports (e.g., channel state information measurement reports) to a BS (or other network node). For example, a BS may configure a UE to measure one or more quantities (e.g., reference signal receive power (RSRP), determine channel state information (CSI), or determine or measure other information or quantity) for one or more resources or beams. Thus, the measurement report configuration may indicate the quantity or quantities to be measured and for one or more specific resources or beams. For example, a UE may be configured to measure and report one or more quantities, e.g., CSI and/or RSRP for channel state information-reference signal (CSI-RS) beams and/or synchronization signal blocks (SSBs) beams. As an illustrative example, a UE may measure one or more signal parameters (e.g., link quality) of reference signals received from a BS, and may send a channel state information (CSI) report to the BS. An example CSI report, may include, for example, one or more of: a RSRP (reference signal receive power); a Rank Indicator (RI), which is a suitable number of transmission layers for a downlink (DL) transmission; a Precoder Matrix Indicator (PMI), which may indicate what a device (e.g., UE) estimates as a suitable precoder matrix based on the selected rank; and a Channel Quality Indication (or channel quality indicator) (CQI), which may express or indicate the BS-UE channel or link quality, as measured by the UE. The CQI may indicate what the UE estimates as a suitable channel coding rate and modulation scheme based on the selected precoder matrix. In general, precoding may include a UE (or other node) applying a set of precoding weights (each weight including amplitude and/or phase) to a signal or to an antenna (e.g., in order to change the amplitude and/or phase of a transmitted signal), for example, based on the qualities of a channel between the UE and the BS or network node.

Also, in some cases, wireless networks may employ a cooperative joint transmission that may include (e.g., simultaneous) transmission of data or a signal from multiple transmitters (e.g., from multiple network nodes) to the same receiver device (e.g., UE). A non-limiting example of cooperative joint transmission may include joint transmission-cooperative multipoint (JT-COMP). For example, in the case of coherent joint transmission, the network may have knowledge regarding the properties of the respective channels between the receiver device and each of the transmitters. This channel knowledge may be provided to the transmitters or the network, e.g., based on CSI measurement reports sent by the UE (or receiver device) to each of the transmitters (BSs, or other network nodes). A precoder (e.g., provided at a BS, a central unit (CU), or other network node or other location) may estimate precoding weights to be applied by each of the transmitters (BSs, or network nodes) for the cooperative joint transmission, e.g., in order to increase SINR or performance of the jointly transmitted signal that is received at the receiver device, while decreasing interference at other locations. Thus, for example, precoding weights may be designed by the precoder, and provided to each of the transmitters or network nodes, so that constructive superposition of the transmitted signals at the receiver (or UE) may improve SINR of the signal, and decrease interference, for example.

However, for a cooperative transmission, such as a cooperative joint transmission (e.g., such as joint transmission-cooperative multipoint (JT-COMP)), performance degradation may occur, at least in some cases, due to non-synchronization in amplitude, phase, and/or timing of transmitted signals among the transmitters. For example, to provide constructive superposition of signals at the receiver (and thus improved SINR or other performance indicators), and destructive superposition at other locations, there should be a synchronization in amplitude, phase and/or timing of signals at the receiver.

However, there may exist various performance limitations or imperfections of a device (or electronics) of a wireless transmitter (e.g., of a UE, BS or other network node), that may decrease or limit transmission performance, either for a single transmitter, and/or for a case of multiple cooperating transmitters (e.g., cooperative joint transmission). As an example, parasitic effects may cause performance degradation in many situations. Parasitic effects may be based on parasitic capacitance or stray capacitance that results in unwanted capacitance that exists between parts (e.g., conductors) of an electronic device or integrated circuit because of the close proximity of the conductors. For example, although not designed as a capacitor, there may typically exist a non-zero capacitance between two conductors of an electronic circuit or device. Parasitic effects may be especially problematic at higher frequencies. For example, parasitic effects or parasitic capacitance may decrease performance by causing, e.g., radio frequency (RF) local oscillator (LO) frequency drifts, LO phase noise, time synchronization errors, channel estimation errors, CSI quantization errors, CSI prediction errors, etc., and/or other errors. Thus, for example, parasitic effects at one or more transmitters (e.g., BSs, transmitter receiver points (TRPS), relay nodes, or other network nodes) may cause non-synchronization between transmitters in amplitude, phase and/or timing of signals received at a receiver or UE, as part of a cooperative joint transmission. Parasitic effects are merely one example of errors, problems or inaccuracies that may arise in wireless signal transmission or for a transmitter, and others may occur as well.

Therefore, according to an example embodiment, precoding weights may be determined (e.g., by a precoder or by a controller or central unit) for a transmission from one or more network nodes, so as to provide a predetermined signal at a reference node (e.g., which may be a UE, user device, or other node). The predetermined signal may be any signal with predetermined (or known) properties. For example, the predetermined signal may be, e.g., either a notch signal, having an amplitude, for one or more subcarriers, that is less than a first threshold; or a peak signal having an amplitude, for one or more subcarriers, that is greater than a second threshold. Thus, a notch signal or a peak signal are examples of a predetermined signal that may be detected by a reference node. For example, the precoding weights for at least one network node (e.g., as part of the cooperative joint transmission from a plurality of network nodes) may be based on channel properties (e.g., based on the CSI measurement reports from the reference node) of the respective channels between the reference node and each network node that is participating in the cooperative joint transmission.

Thus, for example, each of the network nodes may transmit a precoded tracking signal (e.g., based on the precoding weights designed, based on the respective channels, to provide the predetermined signal at the reference node or reference point). The reference node may track the predetermined signal (e.g., notch signal or peak signal), by determining if the predetermined signal is present (or has been detected) at the tracking node. Thus, the precoding weights may, for example, be designed by a precoder or central unit (CU) or controller, based on the respective channel properties, so as to provide (e.g., based on superposition of the transmitted signals) the predetermined signal (e.g., notch signal or peak signal) at the reference node. In an example embodiment, the reference node may determine whether the received signal (e.g., which may be a signal that is based on superposition of the signals received from the plurality of network nodes for the cooperative joint transmission) is the predetermined signal. Thus, if the predetermined signal is a notch signal, the reference node may determine whether or not the received signal has an amplitude that is less than a first threshold.

However, according to an example embodiment, at least in some cases, if the precoding performance is poor, e.g., if the received signal (that has precoding weights designed to provide the predetermined signal) is not the predetermined signal, this may (at least in some cases) be due to (or resulting from) parasitic effects or other inaccuracies at one or more of the network nodes that are participating in the transmission (e.g., participating in the cooperative joint transmission from the multiple network nodes). Thus, for example, adjustments to transmission parameter(s) at one or more of the network nodes may be performed, and then the reference node may determine if the subsequently received signal is the predetermined signal or not. This process may be repeated until the predetermined signal is finally received at the reference node. The adjustment of network node transmission parameters (e.g., between the initial transmission based on channel conditions or channel report until the predetermined signal is detected by the reference node) may be due to or a result of parasitic effects or other inaccuracies at one or more of the network nodes. Thus, these adjustments to transmission parameters, performed by a network node in this process, may be used by the network node when transmitting to one or more UEs in the cell or cooperation area, e.g., in order to improve transmission performance.

According to an example embodiment, in order to provide information or an indication related to whether or not the predetermined signal was received or not, the reference node may then transmit a message to one or more of the network nodes (and/or to the precoder, central unit, or controller that may determine precoding weights for the one or more network nodes) relating to whether or not the predetermined signal was received by the reference node. For example, the message may include information, such as: an indication of whether or not the predetermined (e.g., notch) signal was received; a (measured) signal parameter, e.g., indicating an amplitude, phase and/or delay or timing of a signal received by the reference node (e.g., where an amplitude, on one or more particular subcarriers, greater than or equal to the first threshold would indicate that the notch signal was not received, and an amplitude of the received signal less than the first threshold would indicate that the notch signal was received); a signal parameter, including at least one of an amplitude, phase or delay, of at least one multipath component (MPC) associated with (e.g., transmitted from) at least one network node, of a signal received by the reference node; a delta or difference between corresponding signal parameters of strongest multipath components of a plurality of network nodes (e.g., difference in amplitudes of two signals or MPCs received from two different network nodes that are part of the cooperative joint transmission, or difference between phases of two signals or MPCs received from two different network nodes, or a difference or delta between timing or delay of two signals or two MPCs received from two different network nodes of the cooperative joint transmission); and/or a suggested change or suggested adjustment for one or more precoding weights that is estimated to more accurately provide the predetermined signal at the reference node.

In an example embodiment, a network node(s) and/or the precoder or central unit may receive the message, and then may adjust one or more transmission parameters for one or more of the network nodes for a second cooperative joint transmission. For example, the network nodes or precoder (or central unit) may adjust (based on the received message) one or more transmission parameters for one or more network nodes by, e.g., adjusting at least one of a precoding weight (each weight may include an amplitude and/or phase) or a local oscillator (LO) frequency of one or more network nodes, to move or adjust a location of the predetermined signal. The network nodes may then transmit a second signal (a second cooperative joint transmission), including a second precoded tracking signal from each network node, based on the adjusted transmission parameters (e.g., based on the adjusted LO frequency and/or adjusted precoding weights that are designed to more accurately provide the predetermined (e.g., notch or peak) signal at the reference node). The reference node may, for example, receive the second signal, based on the second precoded tracking signals from each of the network nodes, and may determine whether the second signal is the predetermined signal (e.g., is a notch or a peak signal) or not. If the predetermined signal (e.g., notch signal or peak signal) is received at the reference node, the reference node may send a message to the controller and/or one or more of the network nodes indicating that the predetermined signal was received or detected by the reference node.

In an example embodiment, at least in some cases, the adjusting of (or adjustment for) one or more transmission parameters may provide an indication of (or may be associated with) parasitic effects or other errors or inaccuracies of a network node(s). Thus, in an example embodiment, one or more of the network nodes may transmit data to the reference node, or to other UEs in a cell or cooperation area (e.g., to UEs that may be near or in proximity to, the reference node), based on the adjusted transmission parameters, or based on the amount of adjustment performed at the network node (e.g., based on the adjustment of LO frequency, and/or change or adjustment to one or more precoding weights (e.g., adjust amplitude and/or phase)), e.g., which may, at least in some cases, accommodate or compensate for at least some portion of the parasitic effects (or other problems or inaccuracies) of a network node.

Therefore, in an example embodiment, from the perspective of a network node, a method may be performed including: determining, by a network node within a wireless network based on at least a channel state information (CSI) measurement report received from a reference node, estimated precoding weights for a signal transmission from at least the network node that is estimated to provide a predetermined signal (e.g., which may be a notch signal, a peak signal, or other predetermined signal) at the reference node; transmitting, by the network node to the reference node based on the estimated precoding weights, a first precoded tracking signal (the first precoded tracking signal from the network node may be among precoded tracking signals that may be transmitted by multiple network nodes as part of a cooperative joint transmission that may be designed to provide the predetermined signal at the reference node); receiving, by the network node from the reference node, a message including information relating to whether or not the predetermined signal was received at the reference node based, at least in part, on the first precoded tracking signal transmitted by the network node; The network node may adjust one or more transmission parameters (e.g., LO frequency and/or precoding weights) of the network node, that is estimated to more accurately provide the predetermined signal at the reference node; and transmitting, by the network node, a second precoded tracking signal based on adjusted transmission parameters.

According to an example embodiment, the network node adjusting a transmission parameter may be based on control information (e.g., an indication of precoding weight(s) adjustment or LO frequency adjustment for the network node) received from another node, e.g., from a DU (distributed unit), another BS or TRP, a controller, a precoder, or other node that may be involved with or may control the calculation or determination of precoding weights for the cooperative joint transmission. In an example embodiment, the adjusting of a transmission parameter for a network node may include, e.g., adjusting an amplitude and/or phase of at least one precoding weight for the network node; adjusting a transmission delay or transmission timing for the network node; or adjusting or tuning a frequency of a local oscillator for the network node.

According to an example embodiment, the message relating to whether or not the predetermined signal was received by the reference node may include measured signal parameter information, an indication of whether or not the predetermined signal was received, and/or suggested adjustments to one or more transmission parameters for one or more network nodes. Thus, for example, the message may include information, such as one or more of: an amplitude of a signal received by the reference node based, at least in part, on the first precoded tracking signal transmitted by the network node; an amplitude and phase of a signal received by the reference node based, at least in part, on the first precoded tracking signal transmitted by the network node; a signal parameter, including at least one of an amplitude, phase or delay, of at least one multipath component associated with the network node, of a signal received by the reference node based, at least in part, on the first precoded tracking signal transmitted by the network node; a difference between corresponding signal parameters of strongest multipath components of a plurality of network nodes; an indication of whether or not a notch signal, having an amplitude for one or more subcarriers that is less than a first threshold, was received at the reference node based, at least in part, on the first precoded tracking signal transmitted by the network node; an indication of whether or not a peak signal, having an amplitude for one or more subcarriers that is greater than a second threshold, was received at the reference node based, at least in part, on the first precoded tracking signal transmitted by the network node; or, a suggested change or adjustment for one or more precoding weights that is estimated to more accurately provide the predetermined signal at the reference node.

According to another example embodiment, e.g., from the perspective of a reference node, a method may be performed including: receiving, by the reference node, a first signal based, at least in part, on a first precoded tracking signal received by the reference node from at least one network node; determining, by the reference node, whether or not the first signal is a predetermined signal; transmitting, by the reference node to the at least one network node, a message relating to whether or not the predetermined signal was received at the reference node; performing the following if the predetermined signal was not received at the reference node: receiving, by the reference node, a second signal based, at least in part, on adjusted transmission parameters, for the at least one network node, in response to the message. Further illustrative examples and example embodiments will now be described.

Figure 2:
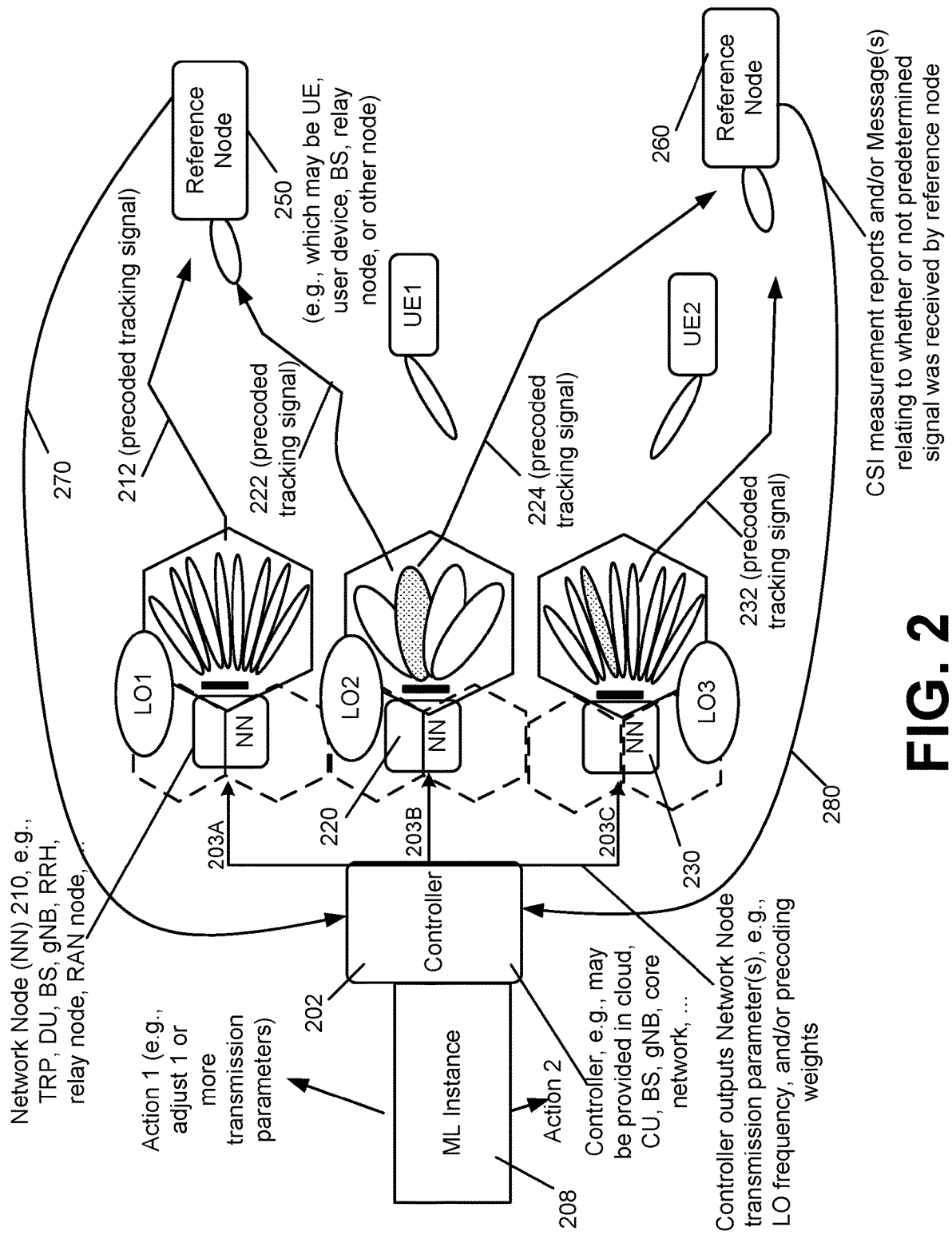
FIG. 2 is a diagram of a system according to an example embodiment where a reference node may track, and provide feedback for, precoding performance from one or more network nodes.

FIG. 2 is a diagram of a system according to an example embodiment where a reference node may track, and provide feedback for, precoding performance from one or more network nodes. According to an example embodiment, any errors in the precoding performance (e.g., any differences between an actually received signal at the reference node and an expected predetermined signal) may, at least in part or at least in some cases, may be due to parasitic effects or other errors or inaccuracies at one or more network nodes. Thus, in order to improve signal transmission performance, feedback may be provided from the reference node to the controller 202 regarding the precoding performance (e.g., providing information relating to whether or not a predetermined signal is detected at the reference node, or signal parameter information, or suggested transmission parameter adjustments, based on the received signal and the expected predetermined signal), e.g., to allow the controller to adjust one or more transmission parameters (such as LO frequency and/or one or more precoding weights of the network node), e.g., in order to compensate for such parasitic effects, errors or inaccuracies that may be present at one or more of the network nodes. Thus, in this manner, for example, a reference node may track (or detect presence or not of) a predetermined signal (e.g., notch signal or peak signal, or other predetermined signal) based on (e.g., cooperative joint transmission of multiple) precoded tracking signals transmitted by one or more of the network nodes, and may provide feedback regarding the precoding performance (e.g., provide feedback to the network node(s) and/or controller 202 regarding whether or not the predetermined signal was received or detected at the reference node.

As shown in FIG. 2, a controller 202 (e.g., which may be provided in the cloud, or on (or as part of) a BS, AP, gNB, a central unit (CU) of a distributed base station, a core network, or a network node or other location) may be connected to or in communication with one or more networks nodes, such as network nodes 210, 220 and 230, for example. Each of the network nodes may be, for example, a transmitter receiver point (TRP), a distributed unit (DU) of a split or distributed base station, a BS, a gNB, a remote radio head (RRH), a relay node, a RAN node, or other network node. One or more reference nodes, such as reference nodes 250 and/or 260, may be provided to determine or measure precoding performance of the controller 202 and/or network nodes, e.g., based on determining whether or not a predetermined signal is received or detected by the reference node, and/or by measuring one or more signal parameters of a received signal. Each network node may include a local oscillator (LO), including LO1 for network node 210, LO2 for network node 220, and LO3 for network node 230. Feedback regarding the precoding performance may be provided, for example, by the reference node(s) sending a message, relating to whether or not the predetermined signal was received or detected by the reference node, to one or more network nodes and/or to controller 202. Each network node may perform both, for example, precoding based on one or more precoding weights, and beamforming.

According to an example embodiment, each (or one or more) of the network nodes 210, 220 and/or 230 may receive CSI measurement reports from each of one or more reference nodes 250, 260 (and possibly also from UEs). For example, reference node 250 may receive CSI-RS signals from network node 210, and receive CSI-RS signals from network node 220. Based on the CSI-RS signals from network node 210, reference node 250 may send a CSI measurement report to network node 210 (e.g., indicating a channel or channel properties of the channel between the reference node 250 and the network node 210). Likewise, network node 210 may also send a CSI measurement report, e.g., indicating the channel or channel properties for the channel between the reference node 250 and the network node 220, to network node 220. Separately, reference node 260 may similarly receive CSI-RS signals from network nodes 220 and 230, and may send respective CSI measurement reports to network nodes 220 and 230. In an example embodiment, the CSI reports or channel information may be sent from the one or more network nodes to controller 202. While the operation for or with respect to reference nodes 250 and 260 may be the same or similar, the operation with respect to reference node 250 will be described in more detail as an illustrative example.

Therefore, according to an example embodiment, precoding weights may be determined by controller 202 for signal transmission from one or more network nodes, that is estimated (e.g., by controller 202) to provide a predetermined signal at a reference node (e.g., which may be a UE, user device, or other node). The predetermined signal may be, e.g., either a notch signal, or a peak signal, or other signal. In an example embodiment, controller 202 may determine precoding weights for a plurality of network nodes to transmit a cooperative joint transmission, e.g., where a precoded tracking signal transmitted by each of the network nodes is estimated (e.g., via superposition of the received signals at the reference node) to provide the predetermined signal at the reference node.

Thus, for example, based on precoding weights provided by controller 202, network node 210 may transmit a precoded tracking signal 212 to reference node 250, and network node 220 may transmit a precoded tracking signal 222 to reference node 250, as part of a cooperative joint transmission to the reference node. The reference node 250 may measure or determine a precoding performance of the controller 202 or the network nodes, based on the received signal at the reference node. If the predetermined signal is received at the reference node 250, this may indicate that the precoder is performing well. However, according to an example embodiment, at least in some cases, if the precoding performance is poor, e.g., if the received signal (that has been transmitted based on precoding weights designed to provide the predetermined signal) is not the predetermined signal, this may (at least in some cases) be due to (or resulting from) parasitic effects, errors or other inaccuracies at one or more of the network nodes that are participating in the (e.g., cooperative joint) transmission. Thus, for example, the reference node may send a message via line (or communications link) 270 (and similarly reference node 260 may send a message via line or communications link 280) to controller 202 providing feedback regarding precoding performance as determined by the reference node 250, such as including information relating to whether or not the predetermined signal was received by reference node 250. The message may include different types of information relating to precoding feedback and/or relating to whether or not the predetermined (e.g., notch or peak) signal was received.

According to an example embodiment, as noted, the reference node 250 may transmit a message to one or more of the network nodes 210 and 220, which may then be forwarded to controller 202 relating to whether or not the predetermined signal was received by the reference node.

For example, the message may include information, such as: an indication of whether or not the predetermined (e.g., notch) signal was received; a (measured) signal parameter, e.g., indicating an amplitude, phase and/or delay or timing of a signal received by the reference node (e.g., where an amplitude, on one or more particular subcarriers, greater than or equal to the first threshold would indicate that the notch signal was not received, and an amplitude of the received signal less than the first threshold would indicate that the notch signal was received); a signal parameter, including at least one of an amplitude, phase or delay, of at least one multipath component (MPC) associated with (e.g., transmitted from) at least one network node, of a signal received by the reference node; a delta or difference between corresponding signal parameters of strongest multipath components of a plurality of network nodes (e.g., difference in amplitudes of two signals or MPCs received from two different network nodes that are part of the cooperative joint transmission, or difference between phases of two signals or MPCs received from two different network nodes, or a difference or delta between timing or delay of two signals or two MPCs received from two different network nodes of the cooperative joint transmission); and/or a suggested change or suggested adjustment for one or more precoding weights that is estimated to more accurately provide the predetermined signal at the reference node.

Based on the feedback (e.g., based on the message) received from the reference node 250, the controller 202 and/or network nodes 210 or 220 may determine adjustments to be made to one or more transmission parameter(s) at one or more of the network nodes 210, 220, to improve precoder performance and/or that are estimated to more accurately provide the predetermined signal at the reference node 250. Controller 202 may then provide or indicate the revised or updated one or more transmission parameters (e.g., updated LO frequency, and/or one or more updated precoding weights for at least one network node) to network node 210 via line 203A, to network node 220 via line 203B, and/or to network node 230 via line 203C, as examples. Thus, in this example, the network node 210 and/or network node 220 would apply the adjusted transmission parameters, which may include adjusting a LO frequency (e.g., an adjusted LO frequency for LO1 for network node 210, and/or an adjusted LO frequency for network node 220) and/or an adjusted precoding weight(s) for one or both network nodes 210, 220. The network nodes may then send a second or additional joint cooperative signal by each network node transmitting a second precoded tracking signal, based on the adjusted transmission parameters, to the reference node 250. This process may be repeated, where reference node 250 may determine whether the predetermined signal was received, and then send a message or feedback to one or more network nodes or the controller, to allow further adjustment of one or more transmission parameters at one or more of the network nodes, e.g., to more accurately provide the predetermined signal at the reference node.

Referring to FIG. 2 again, there are multiple (e.g., three in this example) different RF LOs so that each LO might have its own phase noise and frequency drifts. If the parasitic effects are getting large the performance of a JT CoMP precoder will degrade or might even degrade severely. To track any precoding degradations, the reference nodes (or tracking receivers) observe (or detect) the result of a transmission caused by predefined JT cooperation area wide JT CoMP precoder (e.g., provided at controller 202), which, for example, generates ideally one notch signal at each reference node 250, 260 (e.g., at each tracking receiver location, or at each reference point).

According to an example embodiment, such a notch signal may be sensitive to any parasitic effects, and therefore, may be a good indicator to any parasitic effects degrading the JT CoMP performance. To correct (or compensate for) such unwanted effects, the reference nodes 250, 260 (or tracking receivers) send or transmit feedback related to the (e.g., JT-CoMP) precoding performance of the signal transmitted from the one or more network nodes (e.g., precoding performance of the cooperative joint transmission).

Referring to FIG. 2, in an example embodiment, a machine learning (ML) instance or model (208), or artificial intelligence (AI) neural network (which may be referred to as a, AI model, neural network mode, or ML model) or may be provided to determine (or even optimize) transmission parameters or transmission parameter adjustments that should be performed, for one or more of the network nodes 210, 220, based on the precoding performance feedback or message(s) received from the network nodes, e.g., in order to more accurately provide the predetermined (e.g., notch) signal at the reference node (and thus, provide transmission parameters that may be used for data transmission, which may compensate for parasitic effects, inaccuracies or errors at the network node transmitter).

Thus, ML instance 208 may be or may include a machine learning (ML) algorithm. A ML algorithm may be, for example, a computer implemented algorithm or logic (which may be hardware and/or software) in which a model (e.g., a computational model) is built or generated based on sample data, known as "training data", in order to make predictions or decisions (e.g., to adjust transmission parameters to more accurately provide the predetermined signal at the reference node, as an illustrative example). A ML algorithm may also be referred to as an artificial intelligence (AI) neural network, a neural network model, an AI neural network model, an AI model, etc.

According to an example embodiment, a ML algorithm or neural network may include a model, such as a computational model made up of nodes organized in layers. The nodes may also be referred to as artificial neurons, or simply neurons, and perform a function on provided input to produce some output value. A neural network may require a training period to learn the parameters, e.g., weights, used to map the input to a desired output. The mapping occurs via the function. The weights may be used for the mapping function of the neural network. Each AI (or neural network) model may be trained for a specific task (e.g., such as for determining or adjusting one or more transmission parameters).

For example, the ML instance 208 may first be trained with specific JT-COMP signals that will cause a predetermined signal to be at a different location, or with different properties, and then after feedback, the ML instance may be trained to know that specific transmission parameter adjustments (e.g., specific adjustments to LO frequency and/or precoding weights) cause specific improvements or changes in location of the predetermined signal.

Figure 3:
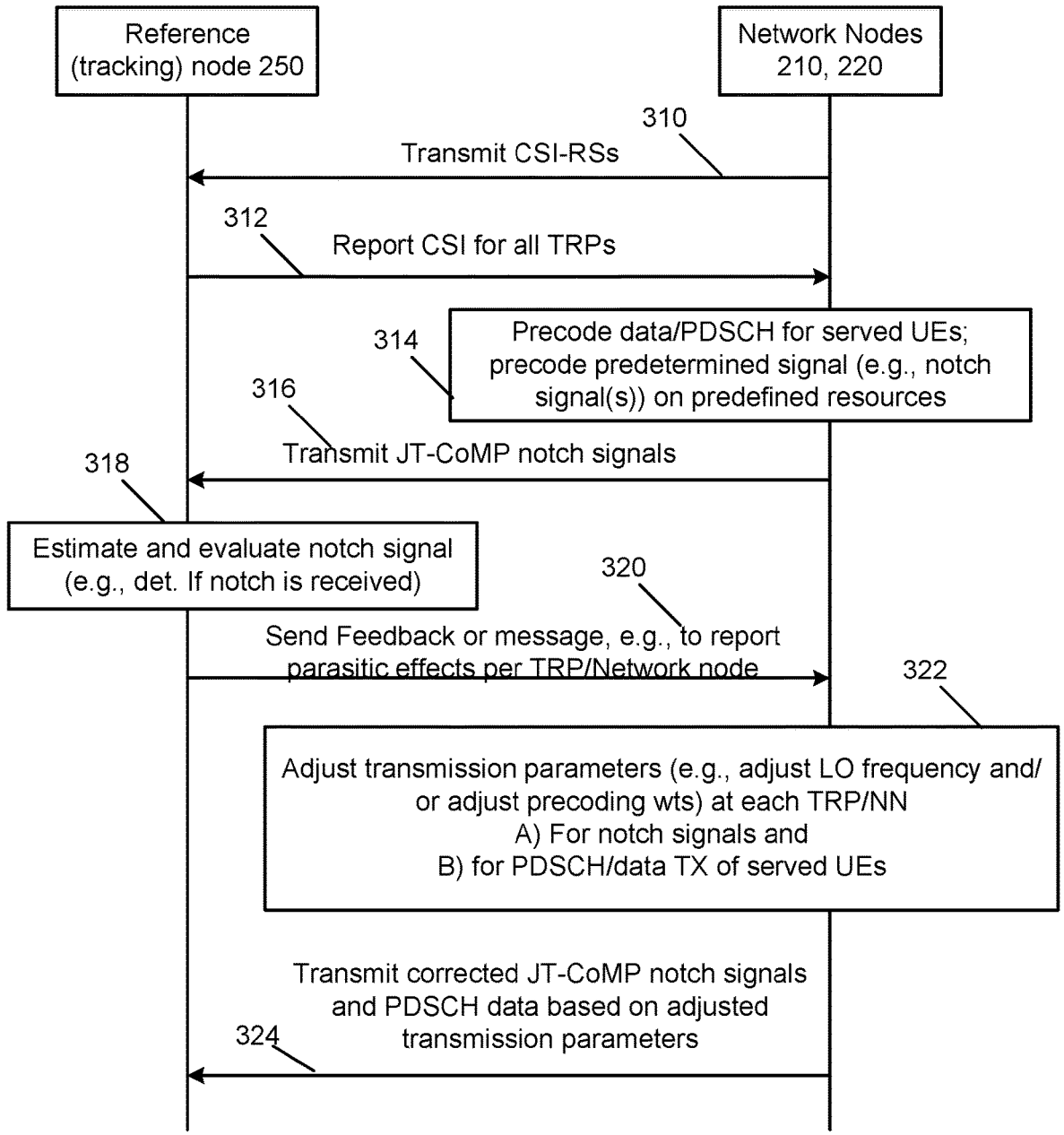
FIG. 3 is a diagram illustrating operation of a network according to an example embodiment.

FIG. 3 is a diagram illustrating operation of a network according to an example embodiment. As shown in FIG. 3, a reference (or tracking) node 250 may be in communication with a group of network nodes 210, 220 (as an illustrative example). At 310, each of network nodes 210 220 transmit CS-RSs (reference signals) to the reference node 250. At 312, the reference node sends CSI measurement reports to each network node (or TRP) 210, 220. At 313, the network nodes (which may be assisted by controller 202, at least in some embodiments) may determine precoding weights based on the CSI measurement reports, and thus, may precode data for transmission to UEs, and may precode a predetermined (e.g., notch) signal, based on a set of precoding weights. At 316, the network nodes may transmit a JT-COMP signal, by each network node transmitting a precoded tracking signal, that is designed to provide a predetermined (e.g., notch) signal at the reference node 250. At 318, the reference node 250 may measure or determine if the predetermined (e.g., notch) signal is received. Alternatively, at 318, the reference node may create or simulate a received signal based on only a strongest MPC from each of the network nodes (e.g., based on superposition of the strongest or greatest amplitude MPC from each of the network nodes involved in the JT-COMP transmission to the reference node 250). At 320, feedback, such as a message relating to whether the predetermined (e.g., notch) signal may be transmitted by reference node 250 to one or more of the network nodes and/or to controller 202, e.g., to provide information relating to parasitic effects (or relating to other errors or inaccuracies for one or more of the network nodes). At 322, one or more of the network nodes (and/or controller 202) may adjust one or more transmission parameters (e.g., adjust LO frequency and/or one or more precoding weights) for one or more of the network nodes 210, 220. At 324, the transmission parameter adjustment for the network nodes 210 may be performed for both a notch (or predetermined) signal transmission to the reference node, and for a transmission of data from the network node(s) to a UE. In this manner, the precoding performance feedback or message relating to whether or not the predetermined signal (e.g., notch signal) was received at the reference node may be used to make adjustments (e.g., adjust a LO frequency and/or adjust one or more precoding weights) at one or more network nodes, e.g., in order to accommodate parasitic effects, errors or inaccuracies in performance at the one or more network nodes. In this manner, signal transmission performance may be improved.

According to an example embodiment, the controller 202 and/or a plurality of network nodes (e.g., TRPs, BSs, . . . ) may, for example, periodically, or even constantly, perform or transmit a cooperative joint transmission (e.g., JT COMP), where a set of JT-COMP precoding weights are provided to, and applied by, the group of network nodes (e.g., network nodes 210, 220, . . . ) designed to provide a predetermined signal (e.g., notch signal, peak signal, or other signal with known or predetermined properties) at a reference node 250 or at a reference point. For example, in order to provide a notch signal, e.g., a signal having an amplitude (for a subcarrier frequency) less than a threshold (e.g., which may be zero power in some cases), it is desirable for the amplitudes of the multiple signals to be the same, and to be out-of-phase, so as to provide destructive superposition at the reference node 250 or at a reference point. For example, any variation in amplitude, phase (or frequency) and/or timing may impact the superposition and thus cause a signal at the reference node or reference point that is above the threshold (and thus not the predetermined notch signal), where such variations may, at least in some cases, be attributed parasitic effects of one or more of the network nodes.

Thus, the adjustments performed (in response to feedback from reference nodes or tracking stations) to LO frequency, and/or precoding weights, that cause the predetermined signal to be more accurately provided or to occur or be generated (or even calculated or simulated based on strongest MPCs from the plurality of network nodes) at the reference node or reference point, may be used and applied by the network nodes to compensate for such parasitic effects and perform data transmissions to UEs within the cell or cooperation area. In this manner, signal transmission performance may be improved. To provide such operation, one or more reference (e.g., tracking nodes) may be provided within a cell or cooperation area, where each reference (tracking) node may have a communications (e.g., wired or wireless) link back to one or more of the network nodes and/or controller 202, to provide feedback. For example, the reference nodes may be implemented as user devices or UEs, or other nodes, and may be mobile nodes, or may be nodes with a fixed location. For the feedback, the reference nodes may, for example, have fast backhaul connections over wired or over the air/wireless PUCCH (physical uplink control channel) connections to the gNB/network node precoders or to the central unit (or controller 202) of the cooperation area, e.g., so that short round trip times can be achieved. Based on the reported precoding performance results of the multiple reference (tracking) node locations, the controller 202 or central unit may, at least in some cases and/or for some example implementations, be able to estimate root causes for precoding errors like relative RF-LO phase noise offsets, frequency offsets, transmit timing delays, etc., based on the feedback from the network nodes. Based on this feedback the cooperation area precoder (e.g., controller 202) can then be readjusted for one or more of the network nodes to counteract these parasitic effects, e.g., by retuning one or more of the RF oscillators, change the precoding weights, etc.

In an example embodiment, for finding the best reaction or response (or action) (e.g., best or optimal adjustment to LO frequency and/or precoding weights for the network nodes) to observed precoding errors (e.g., based on specific feedback from the reference node(s)), a root cause analysis may be performed by controller 202, e.g., relying on machine learning (ML) algorithms, e.g., which may be provided by ML instance 207. Thus, for example, the ML instance (or AI neural network) may predict the impact of the parasitic effects to the other active UEs in the cooperation area from the feedback of one or more reference nodes.

With reference to FIG. 2, there may be, for example, only one RF local oscillator (LO) per cell or per site so that all beams of a site are affected by the same parasitic effects of this LO. Assuming then a maximum size of the cooperation area of three sites then the number of tracking parameters will be quite limited, like the deviations of phase (frequency) and delay per site equal to six or nine parameters.

Figure 4:
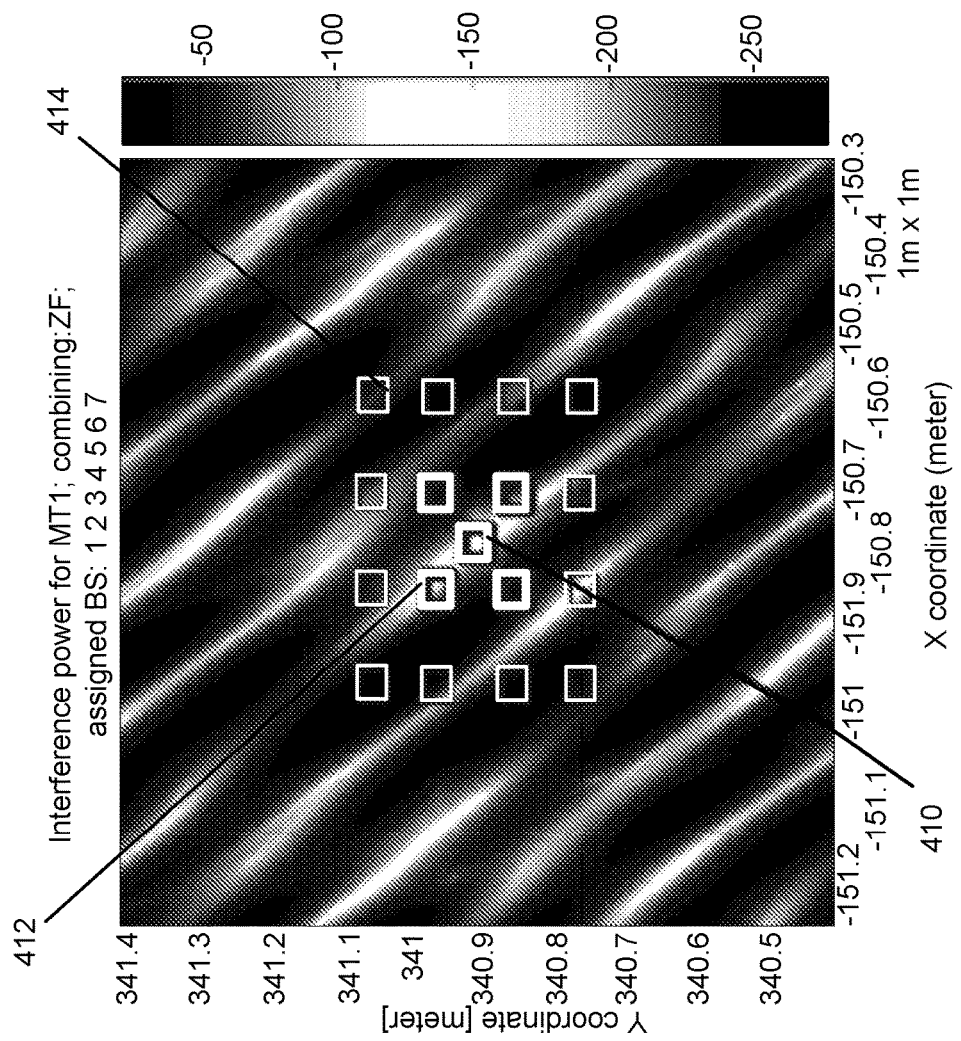
FIG. 4 is a diagram illustrating an antenna system that includes a plurality of antenna elements according to an example embodiment.

FIG. 4 is a diagram illustrating an antenna system 408 that includes a plurality of antenna elements, where JT-COMP precoding weights have been designed or provided that are estimated to provide a predetermined signal (e.g., notch signal) at a center antenna element 410 of reference node 250, for example. The center antenna element 410 is an example, and any reference point or any antenna element may be used as a reference point for which precoding weights are provided that are estimated to provide the notch signal at the reference point. In this example, there are 17 antenna elements provided in the antenna system, including a center antenna element 410, four antenna elements for an inner ring 412 of antenna elements, and 13 antenna elements provided for an outer ring 414 of antenna elements. Well suited as part of a tracking receiver or reference node may be a received (Rx)-antenna arrangement according to FIG. 4, which illustrates an example spatial structure of a notch signal as generated in this case, e.g., from four cooperating transmit stations (four network nodes, as part of a cooperative joint transmission). In this example, precoding weights are applied at the network nodes that are estimated to provide the notch signal at the center antenna element 410 (as an example reference point, but other reference points may be used). Thus, the reference node 250, e.g., to provide improved signal or notch tracking, may include, beside the center antenna element 410 at the exact location of the expected notch signal, one or even two rings of antenna elements (e.g., 412, 414) may be provided, which may allow to fully reconstruct the spatial field close to the ideal notch. This has two benefits: firstly, for the ideal notch the receive signal will be zero or approximately to zero, in at least some cases or situations, and might be therefore masked by the receive (Rx)-noise and interference.

By tracking the receive signals close to the expected location (e.g., center antenna element 410) to receive the notch signal, the antenna system of the reference node 250 may reconstruct or determine the ideal notch position. The second aspect is that based on the tracking of the notch signal or predetermined signal at multiple locations (e.g., detect signals at different antenna elements of an antenna system, and/or from different network nodes of the JT-COMP transmission), different root causes may be detected or determined for certain received signal deviations. For example, each reference node may detect signal parameters (e.g., amplitude, phase, timing) of a signal received at each of multiple antenna elements (e.g., for the signal received at the center element 410, and for the signal received at one or more of the other antenna elements at reference node 450. The reference node 250 may then provide this signal information for one or more of the antenna elements as feedback to the network node or controller 202. Alternatively, reference node 250 may calculate the strongest (e.g., highest amplitude) multi-path component (MPC) of the signal received at the reference point (e.g., center antenna element 410), from each network node (or for each network node). These signal parameters per MPC (or per network node for strongest MPC) may be reported to network nodes or controller 202. Or, the reference node may calculate a difference or delta of respective signal parameters between (e.g., strongest) MPCs of different network nodes (e.g., difference in amplitude of MPCs received from network node 210 and network node 220, a difference in amplitudes received from different network nodes, or difference in timing for MPCs of different network nodes). These delta or difference values may be reported to the network nodes and/or controller, and may be used, e.g., by controller 202 and/or ML instance 208, to determine root cause for precoding errors, and/or improve actions or adjustments made to LO frequencies and/or precoding weights in response to specific signals received by the reference node. This precoding performance feedback information may be fed back, or transmitted, from each, or one or more, of the reference nodes 250, 260, etc., to the network nodes and/or controller 202, e.g., so that controller and/or network nodes may adjust one or more transmission parameters to more accurately provide the predetermined (e.g., notch) signal at the reference node(s) or reference location(s). Also, such transmission parameter adjustments performed (based on the feedback) by one or more network nodes 210, 220, etc., may also be used to compensate for parasitic effects for transmission of data or signals to one or more UEs in the cell or cooperation area (e.g., UE1, UE2).

Also, according to an example embodiment, one or more of the reference nodes 410 (or tracking receivers) may be at a fixed (and/or known) position, e.g., as it may be useful to separate the time variance of the radio channel as such from parasitic effects of the network node transmitters. According to an example embodiment, the system (e.g., controller 202 and/or a reference node) may determine parasitic effect(s) from which network node/gNB (e.g., RF LO or precoding weights from which network node) caused a certain precoder variation or decrease in precoder performance. Then, observations of the spatial field (e.g., measurement of signals from one or more antenna elements of the reference node) around the notch can provide such inference as, for example a time varying reflection from the radio channel from a certain direction will have a different effect on the multitude of Rx-antennas then a phase deviation from an gNB/network node LOS (line-of-sight) link form another transmit location. Also, in some cases, the machine learning (ML) may perform the inferences for the combined receive signals (e.g., ML instance 208 may determine transmit parameters adjustments based on the feedback from one or more reference nodes). In addition, a specific training phase for the ML instance 208 may be performed, e.g., where the gNBs/network nodes transmit sequentially certain set of deviations with respect to LO phase, frequency and/or tx (transmit)-time. From that, the ML instance 208 can learn how and/or which transmit parameters (or transmit parameter adjustments, e.g., to LO frequency and/or precoding weights) affects the overall spatial structure around the notch signal, e.g., including how the various adjustments to LO frequency and/or precoding weights may affect one or more signal parameters (e.g., amplitude, phase and timing, or MPC amplitude phase and/or timing) received at one or more of the antenna elements. In another example embodiment, a ML instance may be provided at one or more of the network nodes, or at one or more of the reference nodes, or both. If it is at the gNB, the reference node (or tracking receiver) may typically report the receive signals from one or more of even all the Rx-antennas.

According to an example embodiment, precoding performance feedback may be provided from multiple reference nodes (or tracking receivers). The controller or network nodes, and/or ML instance 208 may combine the inferences, or determine transmit parameter adjustments for network nodes, based on feedback from all or multiple reference nodes, e.g., to obtain a more reliable inference, or more reliable or accurate transmit parameter adjustments to correct or compensate for the parasitic effects per network node (e.g., per BS or per TRP). The higher the number of reference nodes (or tracking receivers), the more helpful or more accurate becomes ML instance 208 to determine characteristics of parasitic effects per network node (and corresponding transmit parameter adjustments that may be used to compensate for the per network node parasitic effects).

According to an example embodiment, assuming (as an illustrative example) three transceivers (three network nodes or TRPs), a specific tracking mode frames may be defined, and transmitted, such as: i) sequentially transmit tracking (precoded) signals ($TR_{1,2,3}$) sent separately from site (network node/TRP) 1, 2 and 3 then send joint transmissions ii) precoded signals $TR_1$ (from network node 1), plus $TR_2$ (from network node 2), then $TR_1$ plus $TR_3$ and finally iii) joint transmission of $TR_1$, $TR_2$ and $TR_3$ (from network nodes 1-3, respectively). In this manner, the relative parameter deviations (e.g., between network nodes/TRPs) and to determine, for example, the network node/TRP with the LO with the strongest phase drift. It may be desirable to measure parasitic effects, and compensate for them, and in this way, the system (e.g., controller 202 and/or network nodes) may be able to determine which network node(s)/TRPs may be causing the problem or deviation frequency, phase, or time delay, e.g., so that notch signal does not appear at reference point or reference node.

In one embodiment, the reference node may track notch (or other predetermine) signals only for the strongest—or direct LOS—path of the multipath components (e.g., strongest MPC from each of the network nodes) comprising a channel component, while the reflected multipath components (which may typically be delayed, and have a lower amplitude) are suppressed (ignored or filtered in the calculation by the reference node to determine if the predetermined signal is provided at the reference node). In order to determine a strongest MPC of the signal received from each network node, signal profiling may be used, e.g., which may provide an accurate parameter estimation for all relevant multipath components, e.g., of delay $\tau_i$, amplitude $\alpha_i$ and phase $\varphi_i$ of a time domain channel impulse response. This may be helpful in time varying radio channels, where typically only the LOS path is stable, while the reflected multi path components (e.g., having a lower amplitude than the LOS MPC) may typically fluctuate.

Figure 5:
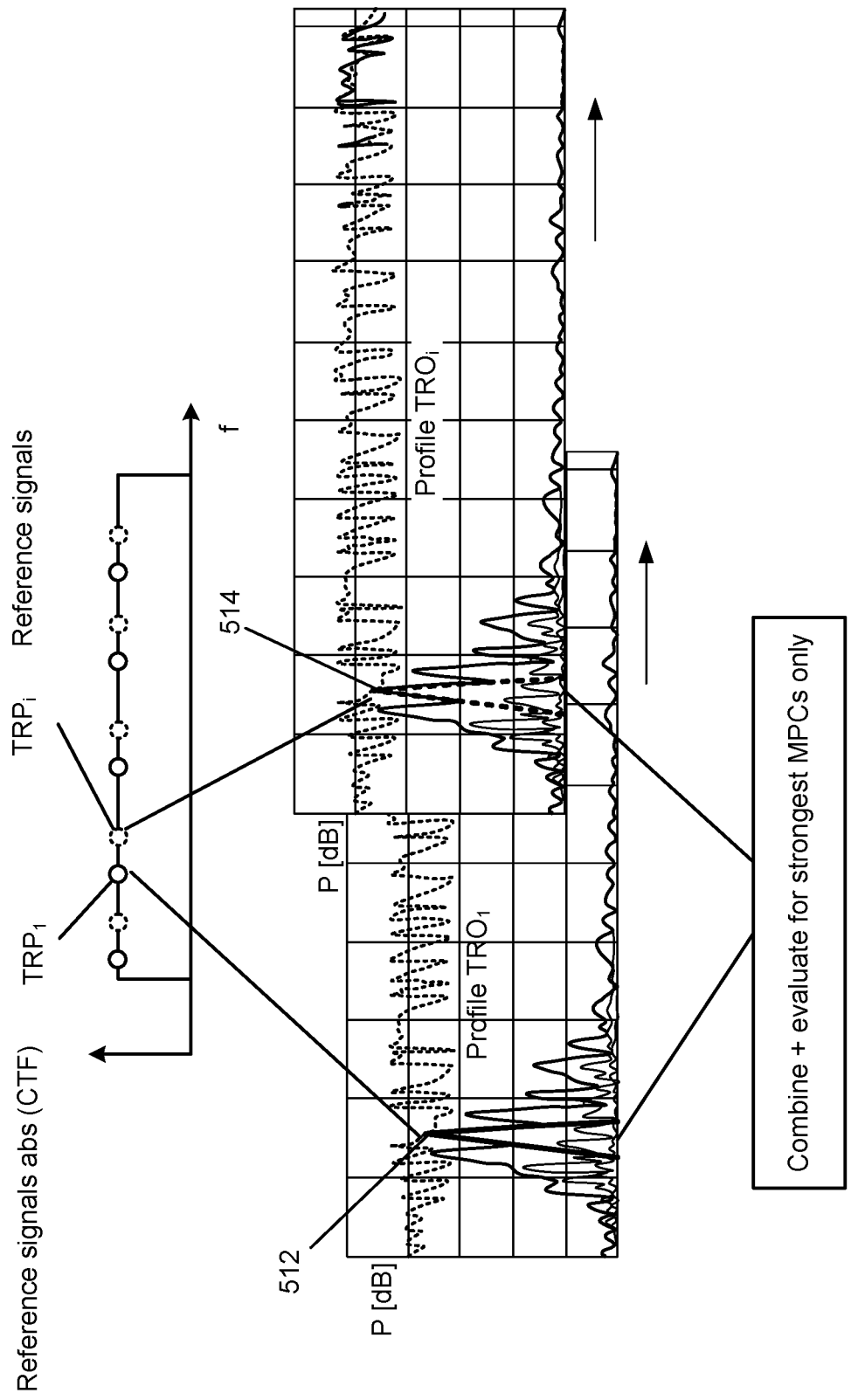
FIG. 5 is a diagram illustrating strongest multipath components (MPCs) from multiple network nodes (or TRPs).

FIG. 5 is a diagram illustrating strongest multipath components (MPCs) from multiple network nodes or TRPs. Several MPCs are shown for $TRP_1$, and for $TRP_i$. FIG. 5 shows a strongest MPC 512 (among a plurality of MPCs) from $TRP_1$, and a strongest MPC 514 from $TRP_i$. In an example embodiment, in a first step all TRPs transmit simultaneously their tracking reference signals—or CSI-RSs—on orthogonal resource elements. Based on these reference signals the reference node 250 (or tracking receiver) calculates a profiled time domain channel impulse response (CIR) per channel component and identifies the parameters for the strongest multi path component (e.g., see strongest MPCs 512, 514). By combining these strongest multi path components, e.g., via simulated superposition of such strongest MPCs from each network node/TRP by the reference node 250) to one virtual Rx-signal—or by adding up the signals per TRP into one common Rx-signal, the network node may perform the notch signal tracking for these strongest MPCs only. Note that the CSI reporting for doing the notch precoding may then also consider only the strongest multi path components (MPCs).

In this manner, the notches (notch signals) may be tracked (e.g., detected presence of a notch at a reference point, or not, and/or presence of the notch at a location other than a reference point, such as another antenna element) at multiple predefined subcarriers at certain predefined physical resource blocks (PRB). In one special case this might include all subcarriers, which provides according noise reduction and accuracy gains, but one has to consider the overhead as well. As an illustrative example, notch signals may be generated for three reference nodes (or tracking receivers) at three spatial locations (reference points) in the cooperation area and transmitting such notches every TTI or PRB of 168 resource elements as well as every tenth PRB of 100 PRBs (=20 MHz bandwidth). In such an example, the related tracking overhead would be around 0.2 percent. This allows an accurate tracking every millisecond so that phase slope variations up to about 0.1 to 1 KHz could be tracked ideally.

In another embodiment instead of specific fixed reference nodes (or tracking transceivers) the network nodes (TRPs or gNBs) may identify suitable UEs from the currently active UEs in the cooperation area as reference nodes or tracking transceivers. Suitable UEs may, for example, be UEs with low mobility, good LOS connection to one or more (or all) network nodes, etc. The benefit is then that there is no need for specific pre-installation of reference nodes (or tracking receivers).

In an example embodiment, the network nodes (e.g., gNBs, TRPs) as well as the UEs may typically include beamforming gains (e.g., applying beamforming at the transmitter and the receiver) as far as possible with the goal to minimize the resource usage as well as to maximize the SINR for tracking, but this may be included partly by the precoder calculation.

Figure 6:
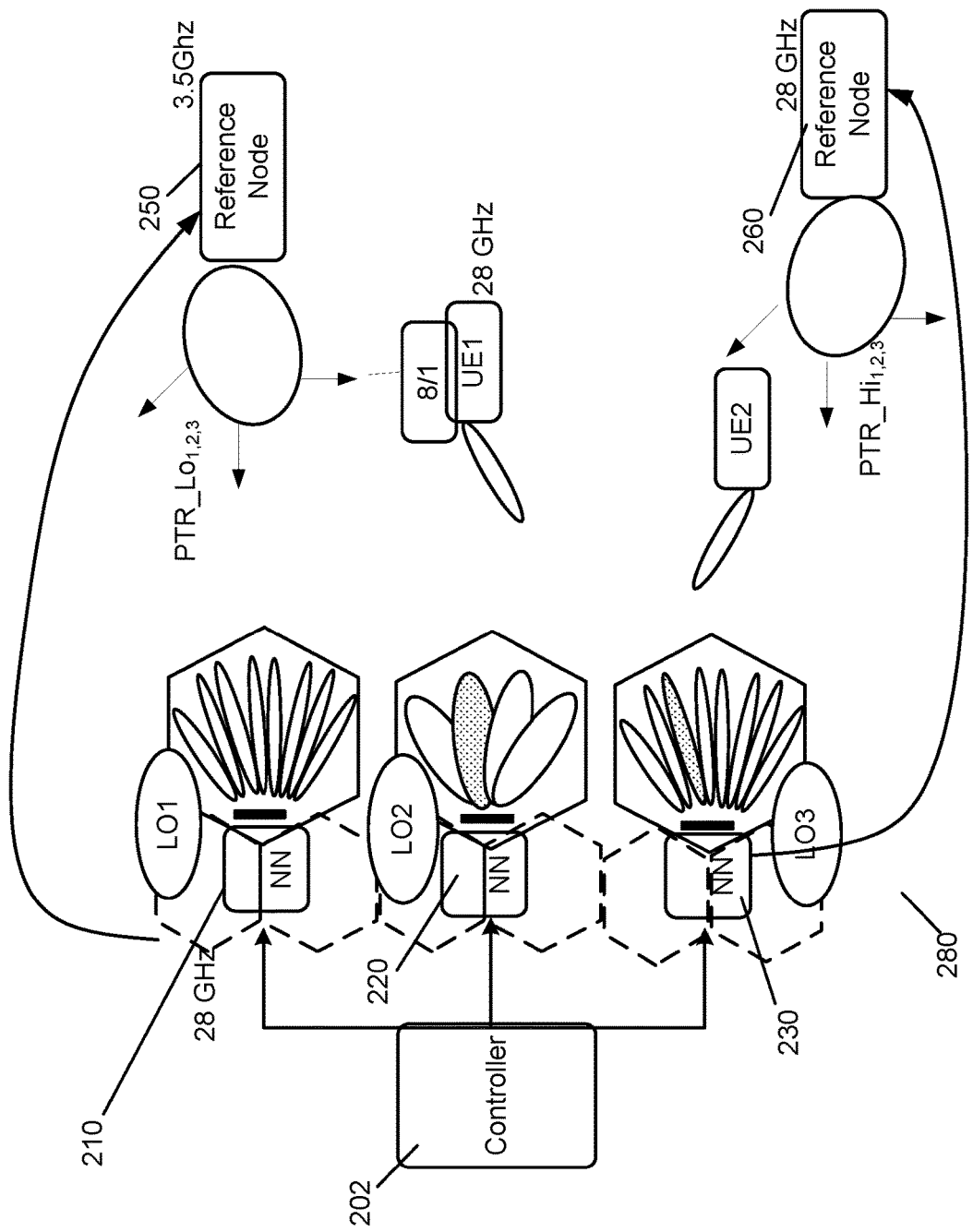
FIG. 6 is a diagram illustrating one or more reference nodes that transmit broad beam phase tracking reference signals to one or more user devices according to an example embodiment.

FIG. 6 is a diagram illustrating one or more reference nodes that transmit broad beam phase tracking reference signals to one or more user devices/UEs according to an example embodiment. UEs may typically receive PTRSs from one or more BSs, and the UE may detect a phase rotation of the received signal, and the UE may correct phase rotation. Thus, PTRSs may be used by a UE for phase correction (can detect phase rotation on transmitted PTRSs) for demodulation (DL demodulation). UE may adjust its phase for DL (downlink) demodulation based on the received PTRSs. In a typical situation, a BS or cell may typically transmit phase tracking reference signals (PTRSs) to UEs via each of a plurality (e.g., 32) beams, by using beam sweeping, which may create a large signalling overhead for a BS, e.g., in order to provide PTRSs to a group of UEs within a cell(s). For example, PTRSs may typically be transmitted by a BS via each of a plurality of beams, in order to obtain beamforming gain, and thus allow the PTRs to sufficiently reach even UEs that are a significant distance from the BS, or at the cell edge. However, requiring the BS to transmit PTRSs via each of a number of beams may create a significant signalling overhead for a BS.

Therefore, according to an example embodiment, one or more reference nodes (250, 260) may be provided, and may be within proximity of one or more UEs, e.g., UE1, UE2. Thus, according to an example embodiment, in place (or instead) of a BS/network node transmitting PTRSs (or in addition to BS transmitting PTRSs), a reference node 250 and/or 260 may transmit PTRSs. For example, one or more reference node may transmit PTRSs via a broad beam (a transmit beam that is broader than a beam width that is used by the BS to transmit PTRSs), or via omnidirectional antenna (e.g., no directional beam is used by reference node to transmit PTRSs). For example, an omidirectional antenna (e.g., no transmit beam), or a broad beam may be used by the reference node(s) to transmit the PTRSs because, e.g., the reference node may be in proximity to a group of one or more UEs to which the PTRSs are directed. For example, there may be reference nodes provided at different locations within a cell or cooperation area, so that PTRSs may be transmitted by different reference nodes, so that all or many of the UEs may be able to receive PTRSs from reference nodes (e.g., rather than from BS(s)). In an example embodiment, the subcarrier used to transmit PTRSs may be fixed or established by standard, or core network but the carrier frequency used to transmit PTRSs may vary.

With respect to FIG. 6, in a first illustrative example, two (or multiple) reference nodes 250, 260 may be transmit (via wide beam or broad beam, or omnidirectional transmission) PTRSs on the same band or carrier (e.g., 28 GHz). One or more of the reference nodes may transmit PTRSs via a broad beam, or via multiple broad beams (e.g., broader than the standard or typical beam used by a BS to transmit PTRSs) and/or via fewer beams than the BS. Thus, by providing one or more reference nodes to transmit PTRSs (e.g., via wide beam or broad beam, or via omnidirectional transmission), PTRS signalling overhead may be reduced (e.g., fewer beams required) and/or signalling overhead may be shifted to one or more reference nodes. In an example embodiment, as noted, an omnidirectional antenna may be used (e.g., no directional beam is used for transmission), e.g., allowing a reference node to transmit in all directions with one PTRS transmission.

Different embodiments are possible. In a first example embodiment, the reference nodes within cell or cooperation area may transmit PTRSs on only the upper band or upper carrier frequency (e.g., 28 GHz). Or, in a second example embodiment, the reference nodes may transmit on only a lower band or lower carrier frequency of 3.5 GHz, e.g., to reach UEs that may be further away from the reference node. In a third example embodiment, some reference node(s) within cell or cooperation area may transmit PTRSs via upper frequency band or upper carrier frequency (e.g., 28 GHz), while other reference node(s) may transmit PTRSs via lower frequency band or lower carrier (e.g., 3.5 GHz). Thus, reference nodes may transmit PTRSs within a cell or cooperation area on upper band (or upper carrier), on lower band (or upper carrier), or on both upper and lower bands. Now—some UEs may be farther away, so may also use different frequency bands.

In an example embodiment, each reference node may receive an instruction (e.g., PTRS configuration) from a network node (or gNB or TRP) to transmit PTRSs on behalf of the network node, and the signalling or control instruction may indicate what frequency band or carrier on which the reference node should transmit the PTRSs (e.g., upper band, lower band, or both). For example, reference node 250 may receive an instruction from network node 210 to transmit PTRSs via low frequency band, shown as $PTR\_Lo_{1,2,3}$. Reference node may likewise receive a control instruction from network node 230 to transmit PTRSs via an upper frequency band, shown as $PTR\_Hi_{1,2,3}$. In an illustrative example, the reference nodes may be UEs, and the network node(s) may send a control instruction or PTRS configuration to one or more UEs to configure the UE to transmit PTRS signals, at either a default or understood frequency band (thus no need to indicate the carrier band/frequency band for PTRS transmission), or an indicated frequency band or carrier frequency.

In an example embodiment, a reference node (e.g., 250) that is transmitting the PTRSs on low frequency band (e.g., 3.5 GHz), or on a non-standard frequency band, may use a frequency divider to divide the frequency of the PTRSs, so that the transmitted low (or non-standard) frequency band (e.g., at 3.5 GHz, as an example) for PTRSs will have the same phase as the standard PTRS signals that may be transmitted at a standard frequency band/carrier frequency of 28 GHz, for example. Thus, as shown in the example of FIG. 6, reference node 250 may use a ⅛ frequency divider to divide the 28 GHz PTRS carrier frequency down to 3.5 GHz carrier frequency or frequency band, e.g., so that phase of PTRSs will be same at received UE, for both frequency band PTRSs. Thus, in an example embodiment, the PTRSs transmitted by reference node 250 via a low carrier frequency of 3.5 GHz and PTRSs transmitted by reference node 260 at a higher carrier frequency of 28 GHz will both provide the same phase information to UE(s), even though transmitted via different carrier frequencies/frequency bands.

Thus, in an example embodiment, reference node or tracking stations (e.g., 250, 260) may transmit reference signals (such as PTRSs) from a single site or multiple sites, which otherwise have to be transmitted multiple times for multiple beams with accordingly large BS/network overhead. This is especially relevant for the upper FR2 frequency band, where the number of beams might be high and time domain beam sweeping is needed due to the limited coverage at such frequency without beamforming gains.

Two different approaches are indicated in FIG. 6, where at the bottom the reference node 260 (or tracking receiver) transmits the signal $PTR\_hi_{1,2,3}$ for the TRPs $TRP_{1,2,3}$. $PTR\_hi_{1,2,3}$ is transmitted in the same RF frequency band as the conventional beam based PTRSs and is directly coupled or derived from the according LOs of the TRPs/network nodes. Therefore, $PTR\_hi_{1,2,3}$ may, in some cases, have similar coverage issues as if transmitted from the TRP/network node directly. One option is then to use some type of power boosting, or to use a single frequency network transmission from the reference node plus broad beams (or omnidirectional transmission) from the network nodes/TRPs. In addition, the reference node might be placed closer to the UEs.

Also, in an example embodiment, in some cases, a coverage gain may be obtained in combination with a down and up conversion of the PTRSs RF frequency from 28 to 3.5 and back to 28 GHz. Then the reference node can transmit the down converted PTRSs signals $PTR\_lo_{1,2,3}$ for the TRPs $TRP_{1,2,3}$ at a RF-frequency of, e.g., 3.5 GHz instead of 28 GHz and provide the according larger FR1 frequency band coverage for all UEs. The related overhead at the down converted FR 1 band is then quite small as mostly empty frames will be transmitted with exception of the PTRs signals. The relative frequencies should be factors of two as then a strict phase coupling between the frequency bands can be achieved more easily. This concept may allow carrier aggregation (CA).

Ideally, based on the precoding results from the one or more reference nodes (e.g., based on detecting whether a predetermined signal is detected or provided at the reference node, based on received signal, or only certain MPCs from one or more network nodes), it may be possible to detect transmission parameter adjustments that may be useful to improve network node transmission, such as by determining LO frequency and/or precoding weight adjustments for one or more network nodes, that may represent parasitic effects at the network node, for example. In some cases, such adjusted transmission parameters may then be used for the transmission of data or signals to one or more UEs within the cell or cooperation area. That way, it may be possible to correct parasitic effects affecting the whole cooperation area for all active UEs These network nodes or tracking transceivers may be provided, for example, at hot spot areas, where maximum efficiency may be most important.

For the solution, where the JT CoMP precoding is limited to the strongest MPC, the tracking of predetermined signals (e.g., notch signals) may provide a robust solution as the analysis and feedback at reference node relies on, e.g., the strongest MPC from each of multiple network nodes that are part of JT CoMP transmission. That way channel fluctuations of NLOS (non-line of sight) channels and its reflections are reduced.

A frequency and/or time domain multi notch signal (e.g., notches at each of multiple subcarriers, or notch signal at each of multiple reference nodes) as the actual received signal, as compared to expected predetermined (e.g., notch) signal may be useful for an accurate estimation of parasitic effects of one or more transmitting network nodes, such as relative phase noise, frequency offsets or time delays between the cooperating cells or sites/cooperating network nodes. Thus, such transmission parameter adjustments performed based on the precoding performance feedback may be used for a transmission to one or more UEs, including JT CoMP data transmissions to one or more UEs.

Predefined transmit parameter variations allow for a training phase and later to identify the root causes of notch degradations based on the spatial field close to the tracking receiver For the example embodiment of UL tracking, the reference nodes may, for example, transmit only one PTRs per cell or per site for all beams (e.g., via broad beam or omnidirectional transmission), which is a significant reduction in PTRS signalling overhead in case of high number of beams as it might be the case for FR2 frequency bands. In combination with the down and up conversion of the PTRs RF frequency from 28 to 3.5 and back to 28 GHz, then the tracking transceiver can provide in addition a high FR1 coverage for all UEs. Without such up down conversion, the transceivers may, at least in some cases, need to be located close to the UE hotspots or have to use some type of power boosting.

Figure 7:
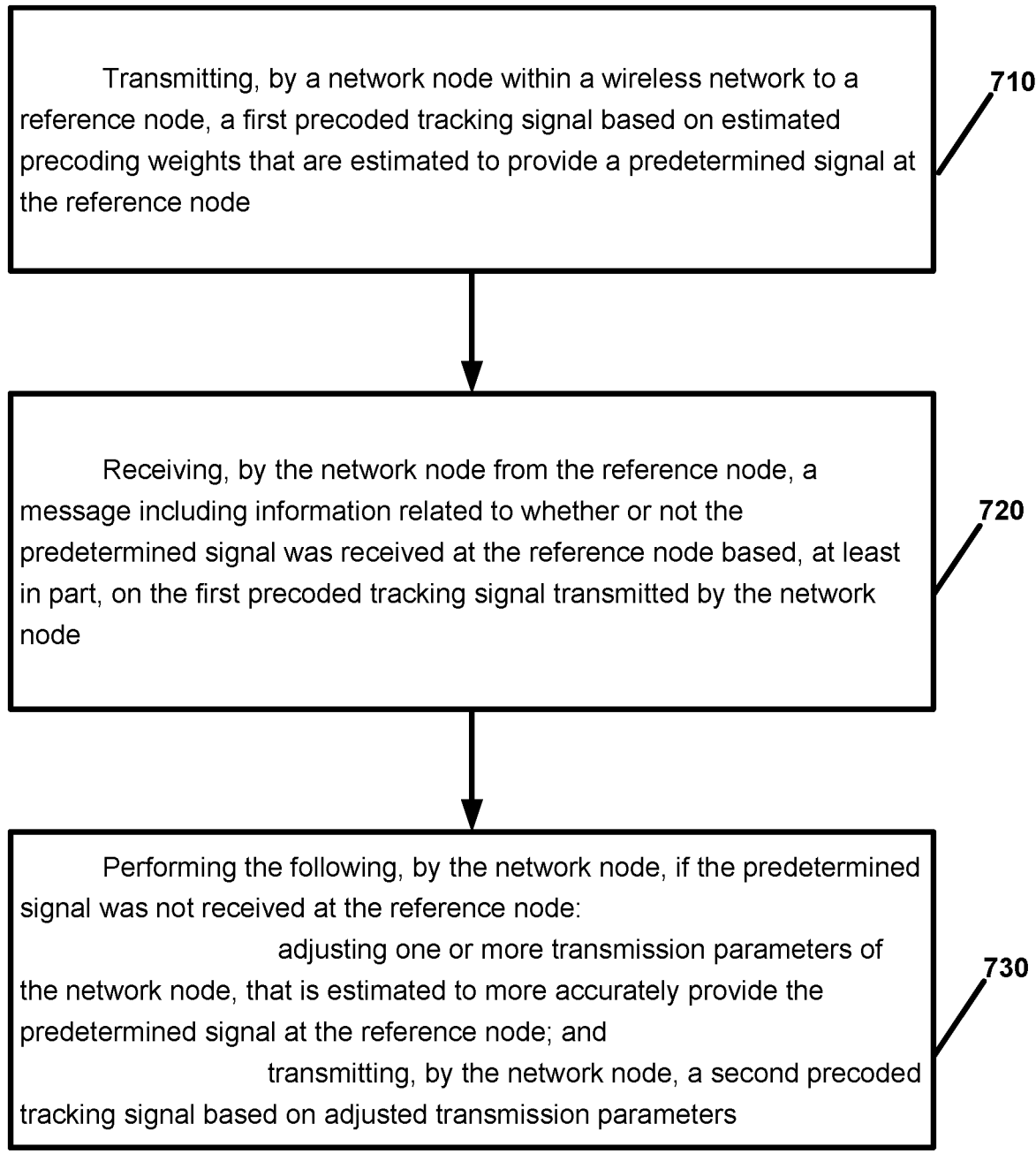
FIG. 7 is a flow chart illustrating operation of a network node according to an example embodiment.

Example 1. FIG. 7 is a flow chart illustrating operation of a network node according to an example embodiment. Operation 710 includes transmitting, by a network node within a wireless network to a reference node, a first precoded tracking signal based on estimated precoding weights that are estimated to provide a predetermined signal at the reference node. Operation 720 includes receiving, by the network node from the reference node, a message including information related to whether or not the predetermined signal was received at the reference node based, at least in part, on the first precoded tracking signal transmitted by the network node. Operation 730 includes performing the following, by the network node, if the predetermined signal was not received at the reference node: adjusting one or more transmission parameters of the network node, that is estimated to more accurately provide the predetermined signal at the reference node; and transmitting, by the network node, a second precoded tracking signal based on adjusted transmission parameters.

Example 2. The method of example 1, further comprising: determining, by the network node based on at least a channel state information measurement report received from the reference node, the estimated precoding weights for a signal transmission from at least the network node that is estimated to provide the predetermined signal at the reference node.

Example 3. The method of any of examples 1-2, wherein the adjusting comprises:
adjusting at least one of a precoding weight or a local oscillator frequency of the network node, to adjust a location of the predetermined signal.

Example 4. The method of any of examples 1-3, further comprising: transmitting, by the network node, based on the adjusted transmission parameters, data to one or more user devices within the wireless network.

Example 5. The method of any of examples 1-4, wherein the predetermined signal comprises at least one of: a notch signal having an amplitude at a reference point, for one or more subcarriers, that is less than a first threshold; or a peak signal having an amplitude at the reference point, for one or more subcarriers, that is greater than a second threshold.

Example 6. The method of any of examples 1-5, wherein the receiving, by the network node from the reference node, a message including information related to whether or not the predetermined signal was received at the reference node comprises receiving, by the network node, information that includes at least one of the following: an amplitude of a signal received by the reference node based, at least in part, on the first precoded tracking signal transmitted by the network node; an amplitude and phase of a signal received by the reference node based, at least in part, on the first precoded tracking signal transmitted by the network node; a signal parameter, including at least one of an amplitude, phase or delay, of at least one multipath component associated with the network node, of a signal received by the reference node based, at least in part, on the first precoded tracking signal transmitted by the network node; a difference between corresponding signal parameters of strongest multipath components of a plurality of network nodes; an indication of whether or not a notch signal, having an amplitude for one or more subcarriers that is less than a first threshold, was received at the reference node based, at least in part, on the first precoded tracking signal transmitted by the network node; an indication of whether or not a peak signal, having an amplitude for one or more subcarriers that is greater than a second threshold, was received at the reference node based, at least in part, on the first precoded tracking signal transmitted by the network node; a suggested change or adjustment for one or more precoding weights that is estimated to more accurately provide the predetermined signal at the reference node.

Example 7. The method of any of examples 1-6, further comprising: receiving, by the network node from the reference node, a further message indicating that the predetermined signal was received at the reference node, based at least in part, on the second precoded tracking signal; and transmitting, by the network node, based on the adjusted transmission parameters, data to one or more user devices within the wireless network.

Example 8. The method of any of examples 1-7, wherein the adjusting, by the network node, one or more transmission parameters of the network node comprises the network node performing one or more of the following adjustments: adjusting an amplitude and/or phase of at least one precoding weight for the network node; adjusting a transmission delay or transmission timing for the network node; or adjusting or tuning a frequency of a local oscillator for the network node.

Example 9. The method of any of examples 1-8, wherein the network node comprises a first network node, and wherein the predetermined signal is a signal provided at the reference node based on a cooperative joint transmission of precoded signals from a plurality of network nodes, including the transmission of the first precoded signal from the first network node and a transmission of another precoded signal from at least one other network node.

Example 10. The method of any of examples 2-9 wherein the determining, by the network node, estimated precoding weights for a signal transmission from at least the network node that is estimated to provide the predetermined signal at the reference node comprises: receiving, by the network node from a centralized unit or controller, the estimated precoding weights.

Example 11. The method of any of examples 1-10, wherein the receiving, by the network node from the reference node, a message relating to whether or not the predetermined signal was received at the reference node based, at least in part, on the first precoded tracking signal transmitted by the network node comprises: receiving, by the network node, at least one signal parameter of at least one multipath component associated with the network node, of a signal received by the reference node based, at least in part, on the first precoded tracking signal transmitted by the network node.

Example 12. The method of any of examples 1-11, wherein the first precoded tracking signal transmitted by the network node includes a plurality of multipath components, wherein the receiving, by the network node from the reference node, a message relating to whether or not the predetermined signal was received at the reference node comprises: receiving, by the network node from the reference node, a message indicating at least whether or not the predetermined signal was simulated at the reference node based, at least in part, on a strongest multipath component, of the plurality of multipath components of the first precoded tracking signal transmitted by at least the network node, while ignoring one or more other multipath components of the plurality of multipath components of the first precoded tracking signal transmitted by the network node.

Example 13. The method of any of examples 1-12, wherein the predetermined signal is a signal, simulated or calculated by the tracking node based on a superposition of at least one multipath component received from each of a plurality of network nodes, as part of a cooperative joint transmission of precoded signals from the plurality of network nodes.

Example 14. The method of any of examples 1-13, wherein: the network node comprises at least one of a transmitter receiver point (TRP), a base station (BS), an access point (AP), a distributed unit (DU), a remote radio head (RRH), or a relay node; the reference node comprises at least one of a user equipment (UE), a user device, a base station (BS), or a relay node.

Figure 8:
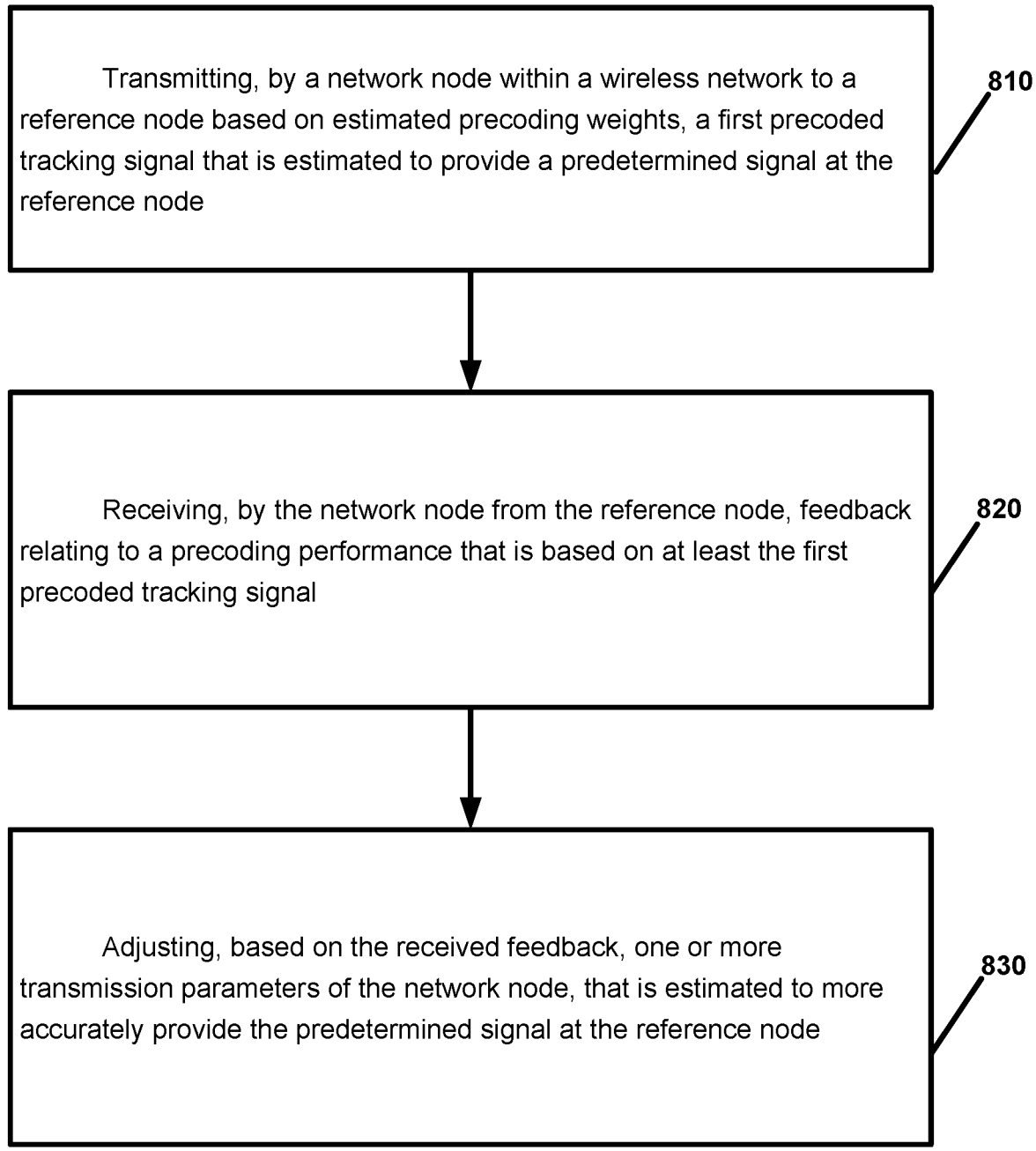
FIG. 8 is a flow chart illustrating operation of a network node according to another example embodiment.

Example 15. FIG. 8 is a flow chart illustrating operation of a network node according to another example embodiment. Operation 810 includes transmitting, by a network node within a wireless network to a reference node based on estimated precoding weights, a first precoded tracking signal that is estimated to provide a predetermined signal at the reference node. Operation 820 includes receiving, by the network node from the reference node, feedback relating to a precoding performance that is based on at least the first precoded tracking signal. And, operation 830 includes adjusting, based on the received feedback, one or more transmission parameters of the network node, that is estimated to more accurately provide the predetermined signal at the reference node.

Example 16. The method of example 15, further comprising: determining, by the network node based on at least a channel state information measurement report received from the reference node, the estimated precoding weights for a signal transmission from at least the network node that is estimated to provide the predetermined signal at the reference node.

Example 17. The method of any of examples 15-16, and further comprising: transmitting, by the network node, a second precoded tracking signal based on adjusted transmission parameters.

Example 18. The method of any of examples 15-17, wherein the receiving feedback comprises: receiving, by the network node from the reference node, a message including information related to whether or not the predetermined signal was received at the reference node based, at least in part, on the first precoded tracking signal transmitted by the network node.

Example 19. An apparatus comprising means for performing the method of any of examples 1-18.

Example 20. A non-transitory computer-readable storage medium comprising instructions stored thereon that, when executed by at least one processor, are configured to cause a computing system to perform the method of any of examples 1-18.

Example 21. An apparatus comprising: at least one processor; and at least one memory including computer program code; the at least one memory and the computer program code configured to, with the at least one processor, cause the apparatus at least to perform the method of any of examples 1-18.

Figure 9:
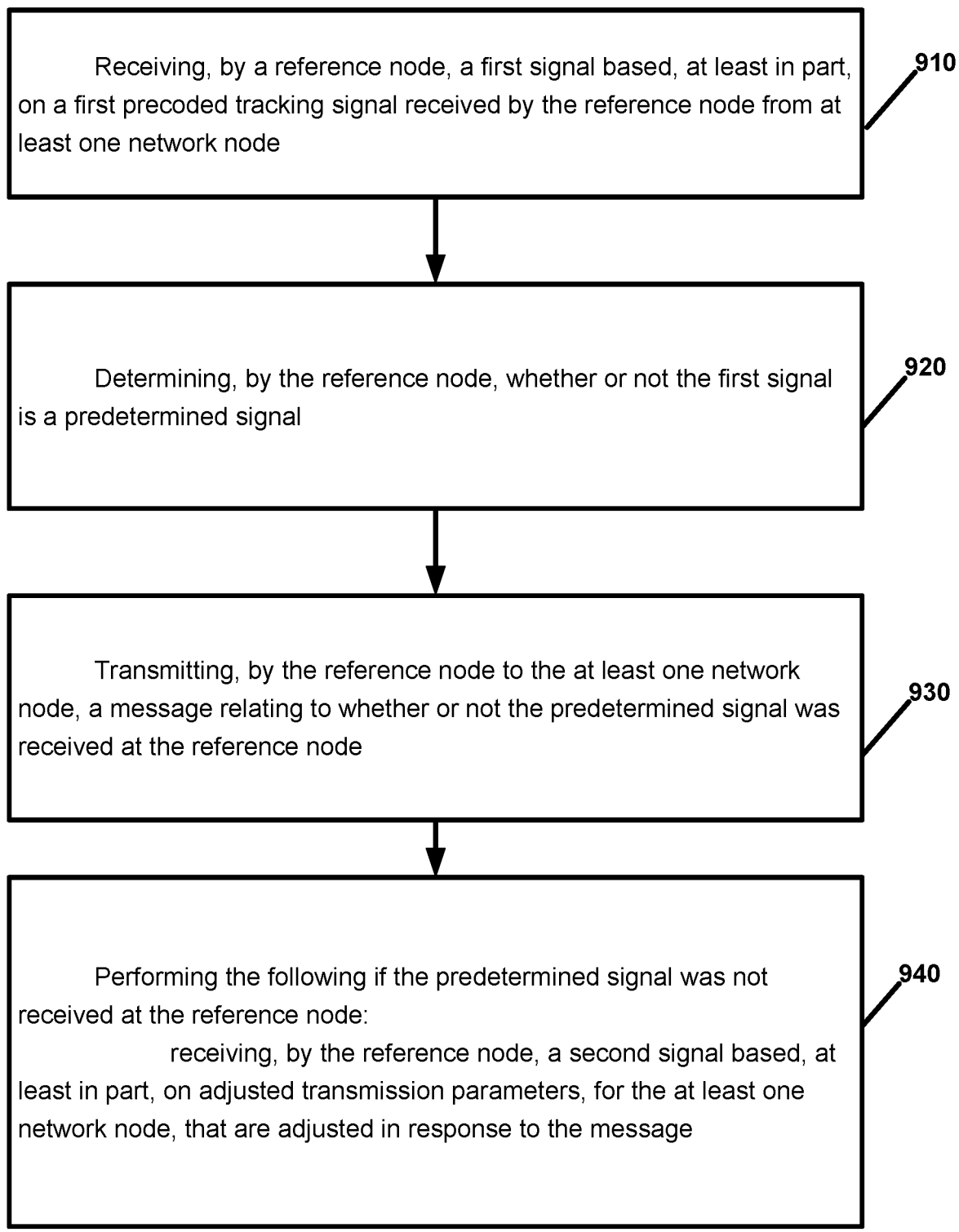
FIG. 9 is a flow chart illustrating operation of a reference node according to an example embodiment.

Example 22. FIG. 9 is a flow chart illustrating operation of a reference node according to an example embodiment. Operation 910 includes receiving, by a reference node, a first signal based, at least in part, on a first precoded tracking signal received by the reference node from at least one network node. Operation 920 includes determining, by the reference node, whether or not the first signal is a predetermined signal. Operation 930 includes transmitting, by the reference node to the at least one network node, a message relating to whether or not the predetermined signal was received at the reference node. And, operation 940 includes performing the following if the predetermined signal was not received at the reference node: receiving, by the reference node, a second signal based, at least in part, on adjusted transmission parameters, for the at least one network node, that are adjusted in response to the message.

Example 23. The method of example 22 wherein the receiving a second signal comprises: receiving, by the reference node, a second signal based, at least in part, on a second precoded tracking signal received from the at least one network node, the second precoded tracking signal being based on adjusted transmission parameters, which are adjusted in response to the message, for the at least one network node.

Example 24. The method of any of examples 22-23, wherein the adjusted transmission parameters comprises at least one of an adjusted precoding weight or a local oscillator frequency of the network node, that is estimated to more accurately provide the predetermined signal at the reference node.

Example 25. The method of any of examples 22-24, wherein the predetermined signal comprises at least one of: a notch signal having an amplitude at a reference point, for one or more subcarriers, that is less than a first threshold; a peak signal having an amplitude at the reference point, for one or more subcarriers, that is greater than a second threshold.

Example 26. The method of any of examples 22-25, wherein the transmitting, by the reference node to the at least one network node, a message related to whether or not the predetermined signal was received at the reference node comprises transmitting, by the reference node to the at least one network node, a message including information that includes at least one of the following: an amplitude of a signal received by the reference node based, at least in part, on the first precoded tracking signal transmitted by the network node; an amplitude and phase of a signal received by the reference node based, at least in part, on the first precoded tracking signal transmitted by the network node; a signal parameter, including at least one of an amplitude, phase or delay, of at least one multipath component associated with the network node, of a signal received by the reference node based, at least in part, on the first precoded tracking signal transmitted by the network node; a difference between corresponding signal parameters of strongest multipath components of a plurality of network nodes; an indication of whether or not a notch signal, having an amplitude for one or more subcarriers that is less than a first threshold, was received at the reference node based, at least in part, on the first precoded tracking signal transmitted by the network node; an indication of whether or not a peak signal, having an amplitude for one or more subcarriers that is greater than a second threshold, was received at the reference node based, at least in part, on the first precoded tracking signal transmitted by the network node; or a suggested change or adjustment for one or more precoding weights that is estimated to more accurately provide the predetermined signal at the reference node.

Example 27. The method of any of examples 22-26, further comprising: determining, by the reference node, that the second signal is the predetermined signal; transmitting, by the reference node to the at least one network node, a message indicating that the predetermined signal was received at the reference node.

Example 28. The method of any of examples 22-27: wherein the first signal is a first signal provided at the reference node based on a cooperative joint transmission of precoded signals from a plurality of network nodes; and wherein the receiving a second signal comprises receiving, by the reference node, a second signal provided at the reference node based on a cooperative joint transmission of precoded signals, based on the adjusted transmission parameters, from the plurality of network nodes in response to the message.

Example 29. The method of any of examples 22-28, further comprising: receiving, by the reference node, data from the at least one network node based on the adjusted transmission parameters.

Example 30. The method of any of examples 22-29, wherein the transmitting a message relating to whether or not the predetermined signal was received at the reference node comprises: selecting, by the reference node within the first signal, at least one multipath component received from the at least one network node; estimating whether or not the predetermined signal has been received by the reference node based on the at least one selected multipath component received from the at least one network node; and transmitting, by the reference node to the at least one network node, a message relating to whether or not the predetermined signal was received at the reference node.

Example 31. The method of example 30: wherein the first signal received by the reference node is based on a superposition of a plurality of multipath components, including at least one multipath component received by the reference node from each of a plurality of network nodes; and, wherein the selecting comprises selecting a strongest multipath component, of the plurality of multipath components, received from each of the plurality of network nodes.

Example 32. The method of any of examples 22-31, wherein: the network node comprises at least one of a transmitter receiver point (TRP), a base station (BS), an access point (AP), a distributed unit (DU), a remote radio head (RRH), or a relay node; the reference node comprises at least one of a user equipment (UE), a user device, a base station (BS), or a relay node.

Example 33. The method of any of examples 22-32, further comprising: receiving, by the reference node from the network node, an instruction to transmit reference signals on behalf of the network node; and transmitting, by the reference node based on the instruction, reference signals to one or more user devices.

Example 34. The method of any of examples 22-33, wherein the reference signals comprise phase tracking reference signals.

Example 35. The method of any of examples 33-34, wherein the receiving the instruction comprises: receiving, by the reference node from the network node, an instruction to transmit phase tracking reference signals on behalf of the network node, and an indication of a frequency band within which the phase tracking reference signals should be transmitted.

Example 36. The method of example 35, wherein the transmitting reference signals comprises: transmitting, by the wireless node, phase tracking reference signals to one or more user devices via the indicated frequency band.

Figure 10:
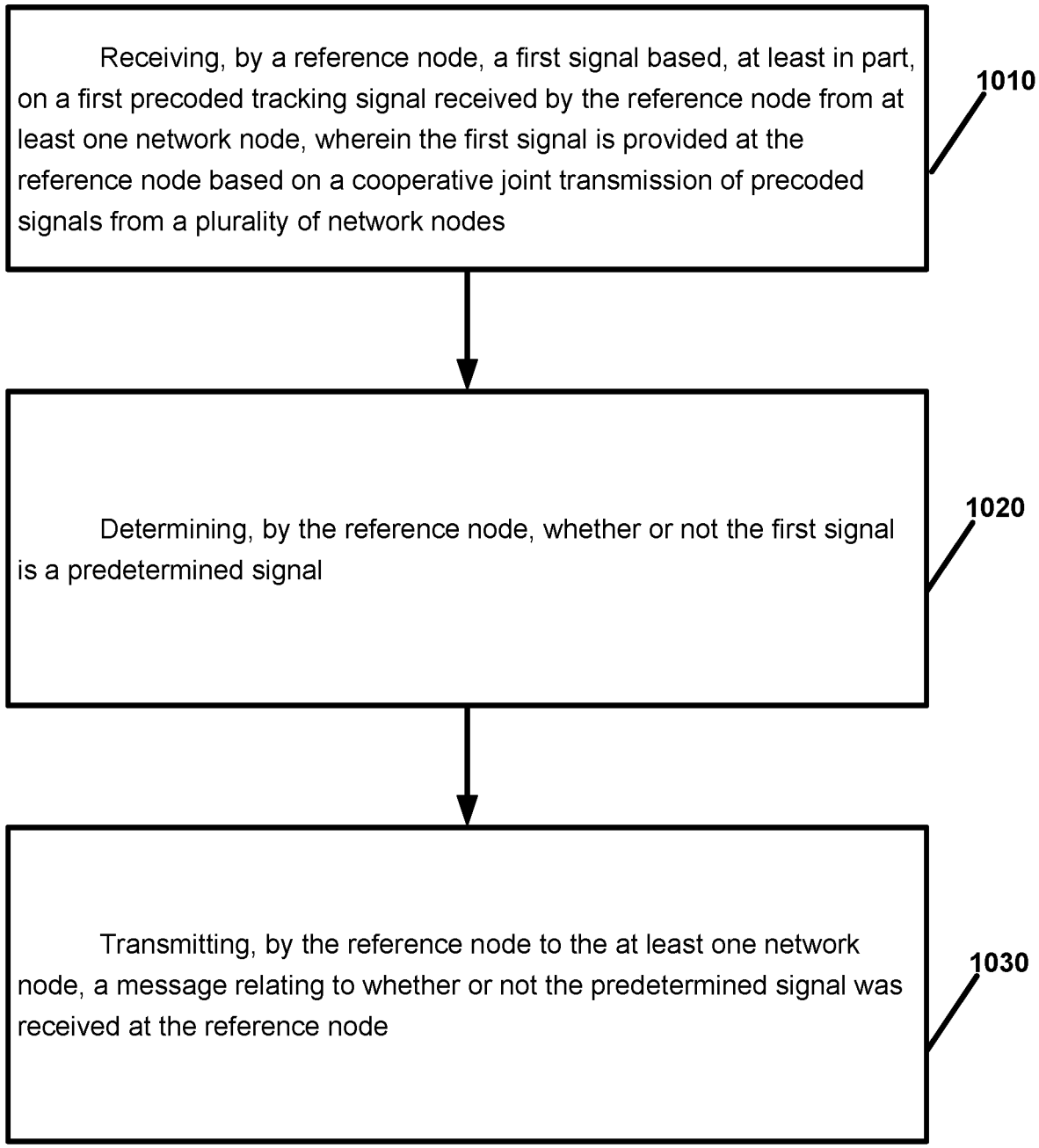
FIG. 10 is a flow chart illustrating operation of a reference node according to another example embodiment.

Example 37. FIG. 10 is a flow chart illustrating operation of a reference node according to another example embodiment. Operation 1010 includes receiving, by a reference node, a first signal based, at least in part, on a first precoded tracking signal received by the reference node from at least one network node, wherein the first signal is provided at the reference node based on a cooperative joint transmission of precoded signals from a plurality of network nodes. Operation 1020 includes determining, by the reference node, whether or not the first signal is a predetermined signal. Operation 1030 includes transmitting, by the reference node to the at least one network node, a message relating to whether or not the predetermined signal was received at the reference node.

Example 38. The method of example 37, wherein the predetermined signal comprises at least one of: a notch signal having an amplitude at a reference point, for one or more subcarriers, that is less than a first threshold; or, a peak signal having an amplitude at the reference point, for one or more subcarriers, that is greater than a second threshold.

Example 39. The method of any of examples 37-38, wherein the transmitting, by the reference node to the at least one network node, a message related to whether or not the predetermined signal was received at the reference node comprises transmitting, by the reference node to the at least one network node, a message including information that includes at least one of the following: an amplitude of a signal received by the reference node based, at least in part, on the first precoded tracking signal transmitted by the network node; an amplitude and phase of a signal received by the reference node based, at least in part, on the first precoded tracking signal transmitted by the network node; a signal parameter, including at least one of an amplitude, phase or delay, of at least one multipath component associated with the network node, of a signal received by the reference node based, at least in part, on the first precoded tracking signal transmitted by the network node; a difference between corresponding signal parameters of strongest multipath components of a plurality of network nodes; an indication of whether or not a notch signal, having an amplitude for one or more subcarriers that is less than a first threshold, was received at the reference node based, at least in part, on the first precoded tracking signal transmitted by the network node; an indication of whether or not a peak signal, having an amplitude for one or more subcarriers that is greater than a second threshold, was received at the reference node based, at least in part, on the first precoded tracking signal transmitted by the network node; or a suggested change or adjustment for one or more precoding weights that is estimated to more accurately provide the predetermined signal at the reference node.

Example 40. The method of any of examples 37-39, further comprising: receiving, by the reference node from the network node, an instruction to transmit reference signals on behalf of the network node; and, transmitting, by the reference node based on the instruction, reference signals to one or more user devices.

Example 41. The method of any of examples 37-40, wherein the reference signals comprise phase tracking reference signals.

Example 42. The method of any of examples 40-41, wherein the receiving the instruction comprises: receiving, by the reference node from the network node, an instruction to transmit phase tracking reference signals on behalf of the network node, and an indication of a frequency band within which the phase tracking reference signals should be transmitted.

Example 43. The method of example 42, wherein the transmitting reference signals comprises: transmitting, by the wireless node, phase tracking reference signals to one or more user devices via the indicated frequency band.

Example 44. An apparatus comprising means for performing the method of any of examples 22-43.

Example 45. A non-transitory computer-readable storage medium comprising instructions stored thereon that, when executed by at least one processor, are configured to cause a computing system to perform the method of any of examples 22-43.

Example 46. An apparatus comprising: at least one processor; and at least one memory including computer program code; the at least one memory and the computer program code configured to, with the at least one processor, cause the apparatus at least to perform the method of any of examples 22-43.

Figure 11:
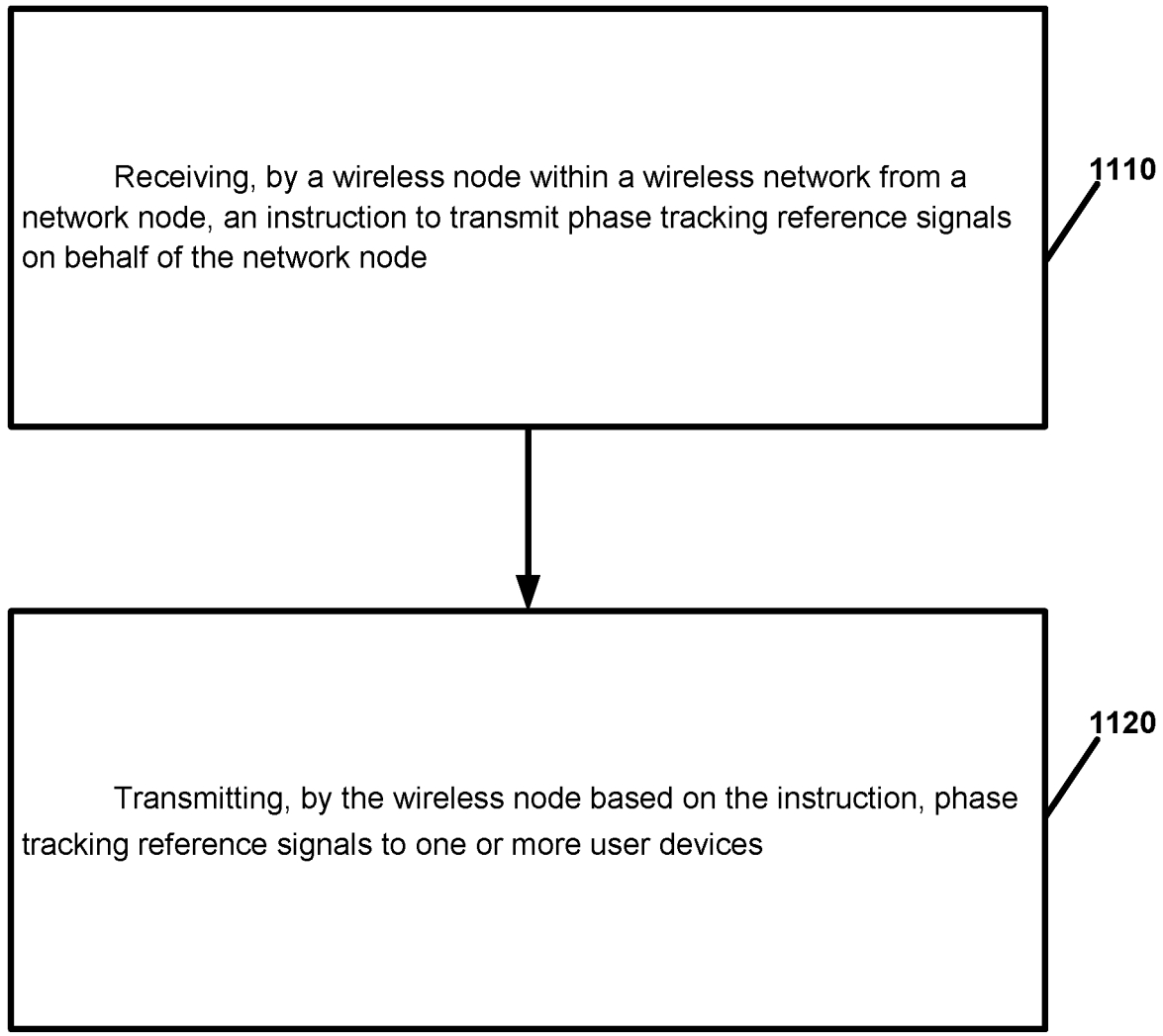
FIG. 11 is a flow chart illustrating operation of a wireless node according to an example embodiment.

Example 47. FIG. 11 is a flow chart illustrating operation of a wireless node according to an example embodiment. Operation 1110 includes receiving, by a wireless node within a wireless network from a network node, an instruction to transmit phase tracking reference signals on behalf of the network node. And, operation 1120 includes transmitting, by the wireless node based on the instruction, phase tracking reference signals to one or more user devices.

Example 48. The method of example 47, wherein the receiving comprises: receiving, by the wireless node from the network node, an instruction to transmit phase tracking reference signals on behalf of the network node, and an indication of a frequency band within which the phase tracking reference signals should be transmitted.

Example 49. The method of example 48, wherein the transmitting comprises: transmitting, by the wireless node based on the instruction, phase tracking reference signals to one or more user devices via the indicated frequency band.

Example 50. The method of any of examples 47-49, further comprising: performing, by the wireless node, a frequency down-conversion or a frequency up-conversion of the phase tracking reference signals to the indicated frequency band, to maintain phase information of the phase tracking reference signals that are transmitted on the indicated frequency band.

Example 51. The method of example 50, wherein a frequency divider is used by the wireless node to down-convert the frequency band from a first frequency band to a second frequency band, while maintaining the phase information of the phase tracking reference signals.

Example 52. the method of any of examples 47-51 wherein the wireless node comprises one of the following: a user device, a user equipment (UE), or other wireless node.

Example 53. An apparatus comprising means for performing the method of any of examples 47-52.

Example 54. A non-transitory computer-readable storage medium comprising instructions stored thereon that, when executed by at least one processor, are configured to cause a computing system to perform the method of any of examples 47-52.

Example 55. An apparatus comprising: at least one processor; and at least one memory including computer program code; the at least one memory and the computer program code configured to, with the at least one processor, cause the apparatus at least to perform the method of any of examples 47-52.

Figure 12:
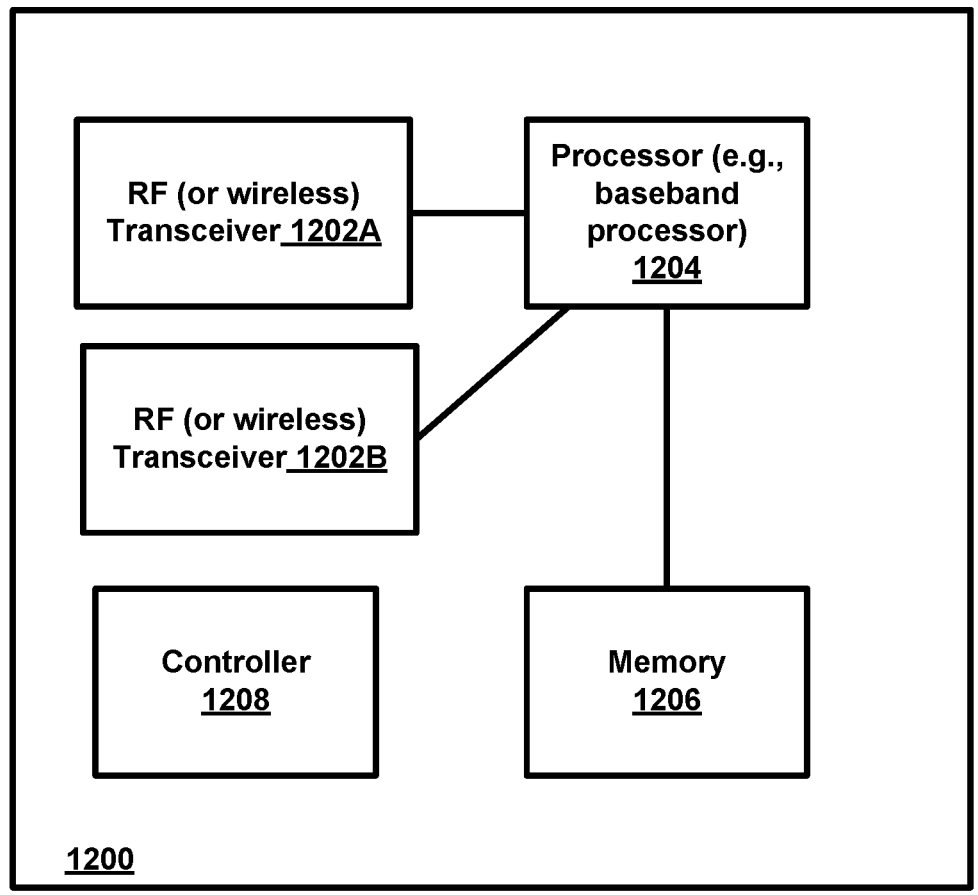
FIG. 12 is a block diagram of a wireless station, wireless node, or network node (e.g., network node, AP, BS, RAN node, gNB, UE or user device, receiver device, or other network node) according to an example embodiment.

FIG. 12 is a block diagram of a wireless station or network node (e.g., AP, BS, gNB or user device/UE, or other network node) 1200 according to an example embodiment. The wireless station 1200 may include, for example, one or more (e.g., two as shown in FIG. 12) RF (radio frequency) or wireless transceivers 1202A, 1202B, where each wireless transceiver includes a transmitter to transmit signals and a receiver to receive signals. The wireless station also includes a processor or control unit/entity (controller) 1204 to execute instructions or software and control transmission and receptions of signals, and a memory 1206 to store data and/or instructions.

Processor 1204 may also make decisions or determinations, generate frames, packets or messages for transmission, decode received frames or messages for further processing, and other tasks or functions described herein. Processor 1204, which may be a baseband processor, for example, may generate messages, packets, frames or other signals for transmission via wireless transceiver 1202 (1202A or 1202B). Processor 1204 may control transmission of signals or messages over a wireless network, and may control the reception of signals or messages, etc., via a wireless network (e.g., after being down-converted by wireless transceiver 1202, for example). Processor 1204 may be programmable and capable of executing software or other instructions stored in memory or on other computer media to perform the various tasks and functions described above, such as one or more of the tasks or methods described above. Processor 1204 may be (or may include), for example, hardware, programmable logic, a programmable processor that executes software or firmware, and/or any combination of these. Using other terminology, processor 1204 and transceiver 1202 together may be considered as a wireless transmitter/receiver system, for example.

In addition, referring to FIG. 12, a controller (or processor) 1208 may execute software and instructions, and may provide overall control for the station 1200, and may provide control for other systems not shown in FIG. 12, such as controlling input/output devices (e.g., display, keypad), and/or may execute software for one or more applications that may be provided on wireless station 1200, such as, for example, an email program, audio/video applications, a word processor, a Voice over IP application, or other application or software.

In addition, a storage medium may be provided that includes stored instructions, which when executed by a controller or processor may result in the processor 1204, or other controller or processor, performing one or more of the functions or tasks described above.

According to another example embodiment, RF or wireless transceiver(s) 1202A/1202B may receive signals or data and/or transmit or send signals or data. Processor 1204 (and possibly transceivers 1202A/1202B) may control the RF or wireless transceiver 1202A or 1202B to receive, send, broadcast or transmit signals or data.

The embodiments are not, however, restricted to the system that is given as an example, but a person skilled in the art may apply the solution to other communication systems. Another example of a suitable communications system is the 5G system. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
   transmitting, by a network node within a wireless network to a reference node, a first precoded tracking signal based on estimated precoding weights that are estimated to provide a predetermined signal at the reference node;
   receiving, by the network node from the reference node, a message including information related to whether or not the predetermined signal was received at the reference node based, at least in part, on the first precoded tracking signal transmitted by the network node; and
   if the predetermined signal was not received at the reference node, then adjusting one or more transmission parameters of the network node, that is are estimated to more accurately provide the predetermined signal at the reference node, and transmitting, by the network node, a second precoded tracking signal based on adjusted transmission parameters;
   wherein the predetermined signal is a signal provided at the reference node based on a cooperative joint transmission of precoded signals from a plurality of network nodes, including the transmission of the first precoded signal from the network node and a transmission of another precoded signal from at least one other network node; and
   wherein the receiving, by the network node from the reference node, a message including information related to whether or not the predetermined signal was received at the reference node comprises receiving, by the network node, a difference between corresponding signal parameters of strongest multipath components of the plurality of network nodes.

2. The method of claim 1, wherein the predetermined signal comprises at least one of:
   a notch signal having an amplitude at a reference point, for one or more subcarriers, that is less than a first threshold; or
   a peak signal having an amplitude at the reference point, for one or more subcarriers, that is greater than a second threshold.

3. The method of claim 1, wherein the receiving, by the network node from the reference node, a message including information related to whether or not the predetermined signal was received at the reference node comprises receiving, by the network node, a signal parameter, including at least one of an amplitude, phase or delay, of at least one multipath component associated with the network node, of a signal received by the reference node based, at least in part, on the first precoded tracking signal transmitted by the network node.

4. The method of claim 1, further comprising:
   receiving, by the network node from the reference node, a further message indicating that the predetermined signal was received at the reference node, based at least in part, on the second precoded tracking signal; and
   transmitting, by the network node, based on the adjusted transmission parameters, data to one or more user devices within the wireless network.

5. The method of claim 1, wherein the adjusting, by the network node, one or more transmission parameters of the network node comprises the network node performing one or more of the following adjustments:
   adjusting an amplitude and/or phase of at least one precoding weight for the network node;
   adjusting a transmission delay or transmission timing for the network node; or
   adjusting or tuning a frequency of a local oscillator for the network node.

6. The method of claim 1, wherein:
   the network node comprises at least one of a transmitter receiver point (TRP), a base station (BS), an access point (AP), a distributed unit (DU), a remote radio head (RRH), or a relay node; and
   the reference node comprises at least one of a user equipment (UE), a user device, a base station (BS), or a relay node.

7. An apparatus comprising at least one processor; and at least one memory including computer program code, the at least one memory and the computer program code configured to, with the at least one processor, cause the apparatus at least to perform the method of claim 1.

8. A non-transitory computer-readable storage medium comprising instructions stored thereon that, when executed by at least one processor, are configured to cause a computing system to perform the method of claim 1.

9. A method comprising:
   receiving, by a reference node, a first signal based, at least in part, on a first precoded tracking signal received by the reference node from at least one network node;
   determining, by the reference node, whether or not the first signal is a predetermined signal;
   transmitting, by the reference node to the at least one network node, a message relating to whether or not the predetermined signal was received at the reference node; and
   if the predetermined signal was not received at the reference node, then receiving, by the reference node, a second signal based, at least in part, on adjusted transmission parameters, for the at least one network node, that are adjusted in response to the message;
   wherein the first signal is a first signal provided at the reference node based on a cooperative joint transmission of precoded signals from a plurality of network nodes;
   wherein the receiving a second signal comprises receiving, by the reference node, a second signal provided at the reference node based on a cooperative joint transmission of precoded signals, based on the adjusted transmission parameters, from the plurality of network nodes in response to the message; and
   wherein the transmitting, by the reference node to the at least one network node, a message related to whether or not the predetermined signal was received at the reference node comprises transmitting a difference between corresponding signal parameters of strongest multipath components of the plurality of network nodes.

10. The method of claim 9, wherein the predetermined signal comprises at least one of:
    a notch signal having an amplitude at a reference point, for one or more subcarriers, that is less than a first threshold; or a peak signal having an amplitude at the reference point, for one or more subcarriers, that is greater than a second threshold.

11. The method of claim 9, wherein the transmitting, by the reference node to the at least one network node, a message related to whether or not the predetermined signal was received at the reference node comprises transmitting, by the reference node to the at least one network node, a signal parameter, including at least one of an amplitude, phase or delay, of at least one multipath component associated with the network node, of a signal received by the reference node based, at least in part, on the first precoded tracking signal transmitted by the network node.

12. The method of claim 9, further comprising:
   determining, by the reference node, that the second signal is the predetermined signal; and
   transmitting, by the reference node to the at least one network node, a message indicating that the predetermined signal was received at the reference node.

13. An apparatus comprising at least one processor; and at least one memory including computer program code; the at least one memory and the computer program code configured to, with the at least one processor, cause the apparatus at least to perform the method of claim 9.

14. A non-transitory computer-readable storage medium comprising instructions stored thereon that, when executed by at least one processor, are configured to cause a computing system to perform the method of claim 9.

* * * * *